US 8,924,272 B2

(12) United States Patent
Venkatasubramanian et al.

(10) Patent No.: US 8,924,272 B2
(45) Date of Patent: Dec. 30, 2014

(54) SYSTEM AND METHOD FOR MANAGEMENT AND VERIFICATION OF INVOICES

(75) Inventors: Ramshankar Venkatasubramanian, Santa Clara, CA (US); Hartmut K. Vogler, Foster City, CA (US); Eckhard Farrenkopf, Mountain View, CA (US); Heinz Kagermann, Leimen (DE); Heinz U. Roggenkemper, Los Gatos, CA (US); Suresh Babu, Los Altos, CA (US); Hila Schlank, Sunnyvale, CA (US)

(73) Assignee: SAP SE, Walldorf, DE (US)

(*) Notice: Subject to any disclaimer, the term of this patent is extended or adjusted under 35 U.S.C. 154(b) by 62 days.

(21) Appl. No.: 12/869,136

(22) Filed: Aug. 26, 2010

(65) Prior Publication Data

US 2014/0067633 A1    Mar. 6, 2014

Related U.S. Application Data

(63) Continuation of application No. 10/980,114, filed on Nov. 1, 2004, now abandoned.

(51) Int. Cl.
*G06Q 30/04* (2012.01)
*G06Q 20/10* (2012.01)

(52) U.S. Cl.
CPC ............ *G06Q 30/04* (2013.01); *G06Q 20/102* (2013.01)
USPC ............................................. 705/35; 705/40

(58) Field of Classification Search
USPC ..................................................... 705/35–45
See application file for complete search history.

(56) References Cited

U.S. PATENT DOCUMENTS

| | | |
|---|---|---|
| 5,963,925 A | 10/1999 | Kolling et al. |
| 6,044,374 A | 3/2000 | Nesamoney et al. |
| 6,073,215 A | 6/2000 | Snyder |
| 6,401,079 B1 | 6/2002 | Kahn et al. |
| 6,507,826 B1 | 1/2003 | Maners |
| 6,529,939 B1 | 3/2003 | Kraft |
| 6,882,986 B1 * | 4/2005 | Heinemann et al. ............ 705/40 |
| 6,928,411 B1 | 8/2005 | Fox et al. |
| 7,206,768 B1 | 4/2007 | deGroeve et al. |
| 2001/0014880 A1 | 8/2001 | Beach et al. |
| 2001/0023414 A1 | 9/2001 | Kumar et al. |
| 2002/0194174 A1 | 12/2002 | Calkins et al. |
| 2003/0110128 A1 | 6/2003 | Foth et al. |
| 2003/0130942 A1 | 7/2003 | Campbell et al. |
| 2003/0204458 A1 | 10/2003 | Carroll et al. |
| 2003/0233321 A1 | 12/2003 | Scolini et al. |
| 2004/0049459 A1 | 3/2004 | Philliou et al. |
| 2004/0153404 A1 | 8/2004 | Rischmueller et al. |
| 2004/0181482 A1 | 9/2004 | Yap |

OTHER PUBLICATIONS

SAP AG L0515, Invoice Verification, SAP R/3 System, Release 4.6C, May 2002, 50040838, Participant Handbook.

* cited by examiner

*Primary Examiner* — Robert R Niquette
*Assistant Examiner* — Chia Yi Liu
(74) *Attorney, Agent, or Firm* — Fountainhead Law Group PC

(57) ABSTRACT

Embodiments of the present invention include architectures and methods for automated management of invoices. Embodiments of the present invention may include techniques for receiving and unifying invoice data, retrieving information about each invoice, verifying each invoice and resolving invoice exceptions. The present invention includes software components for efficiently processing invoices. In other embodiments, the present invention includes methods of processing an invoice.

20 Claims, 23 Drawing Sheets

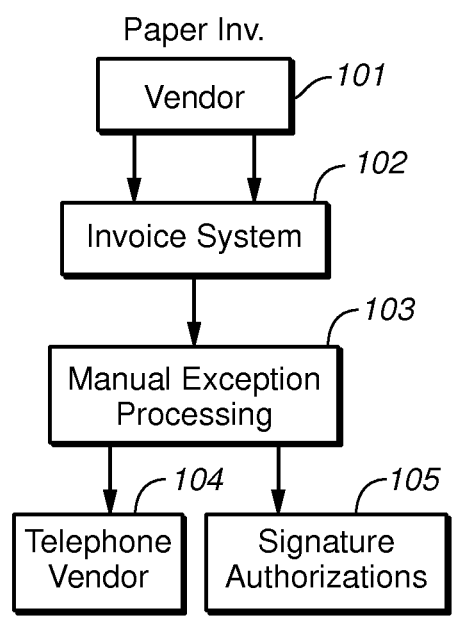
FIG._1
*(PRIOR ART)*

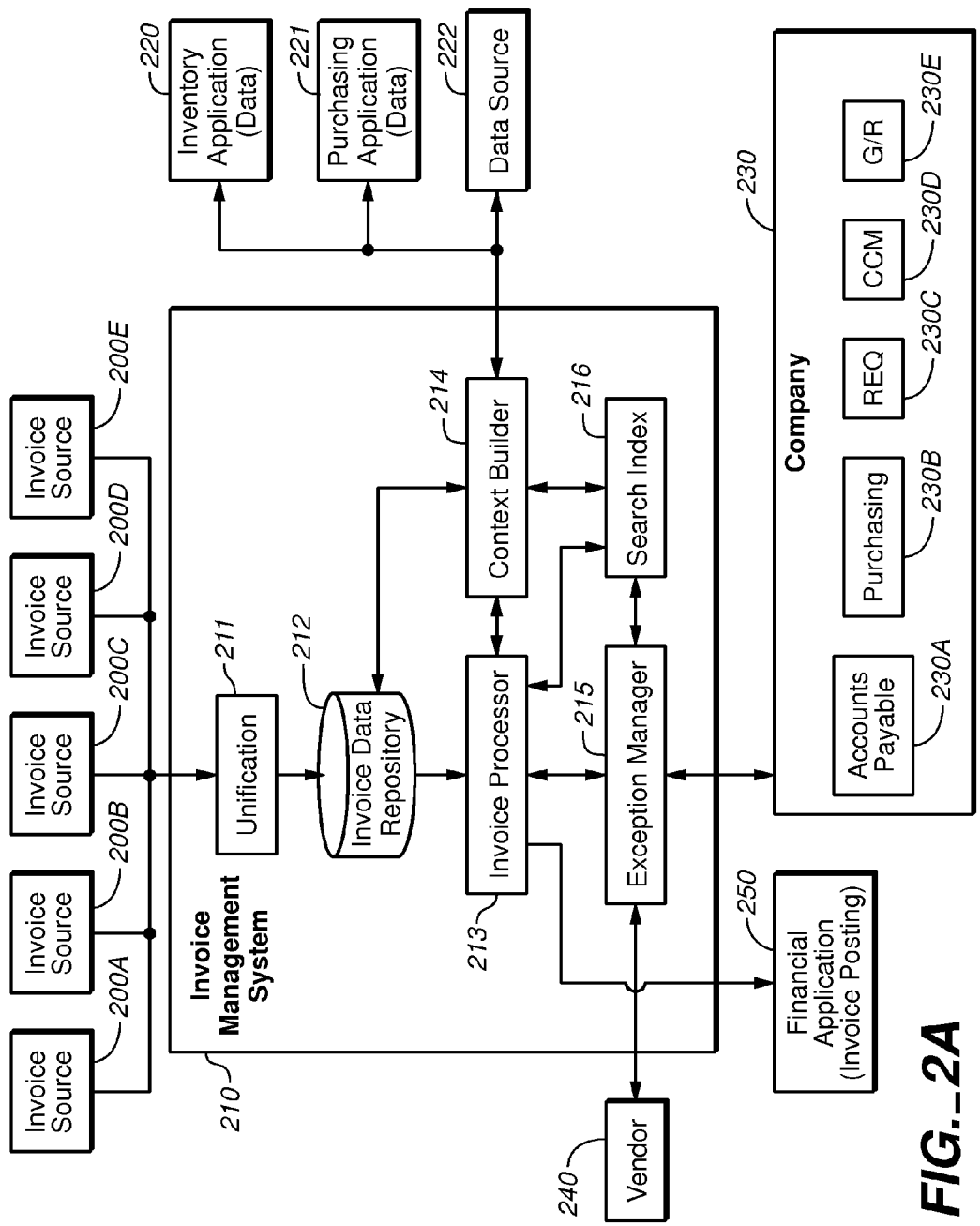

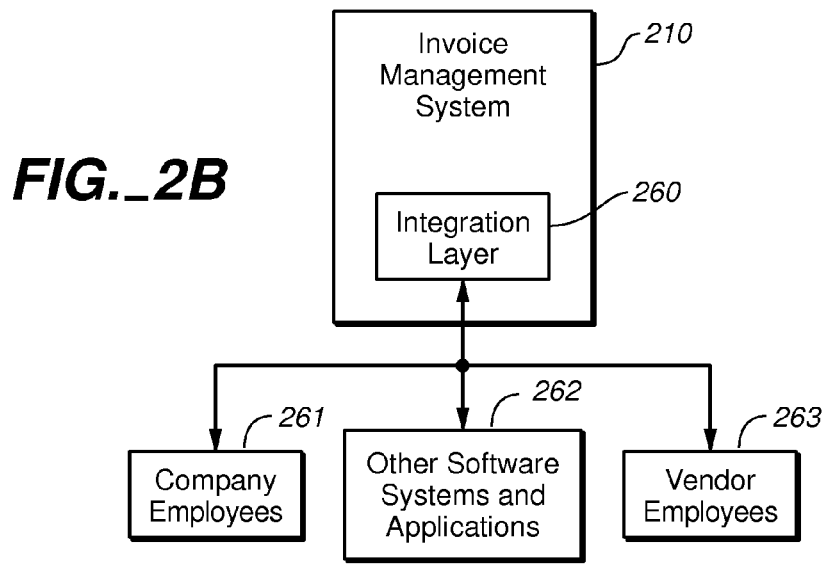
FIG._2B
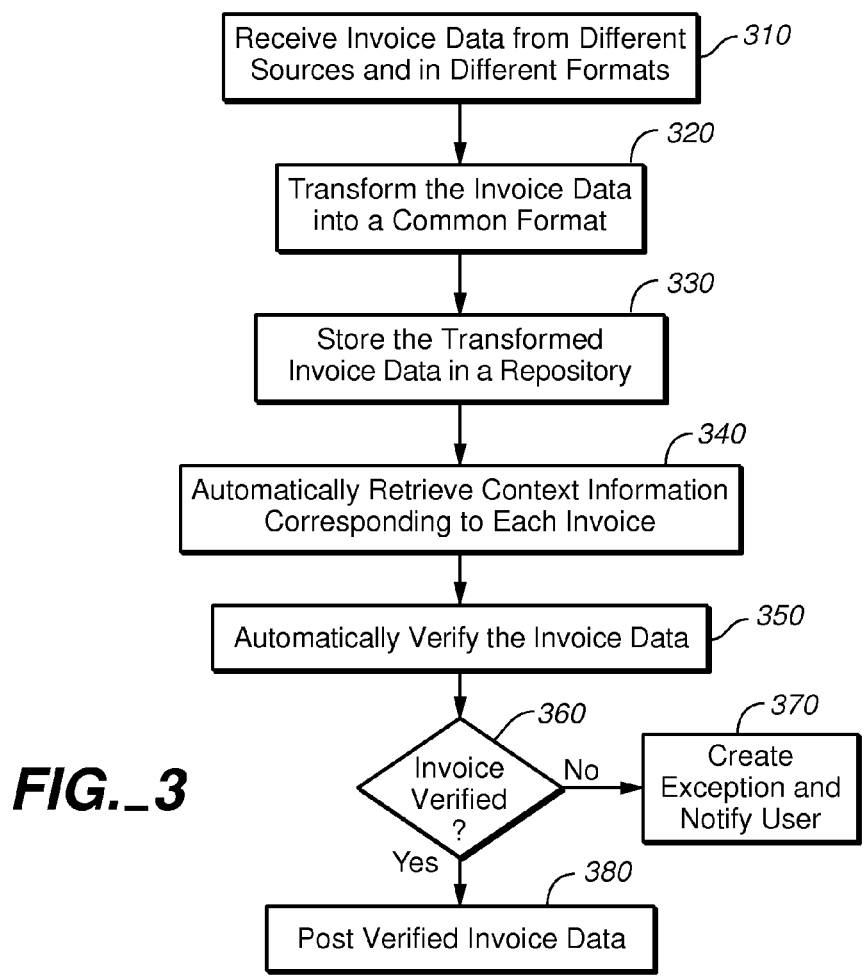
FIG._3

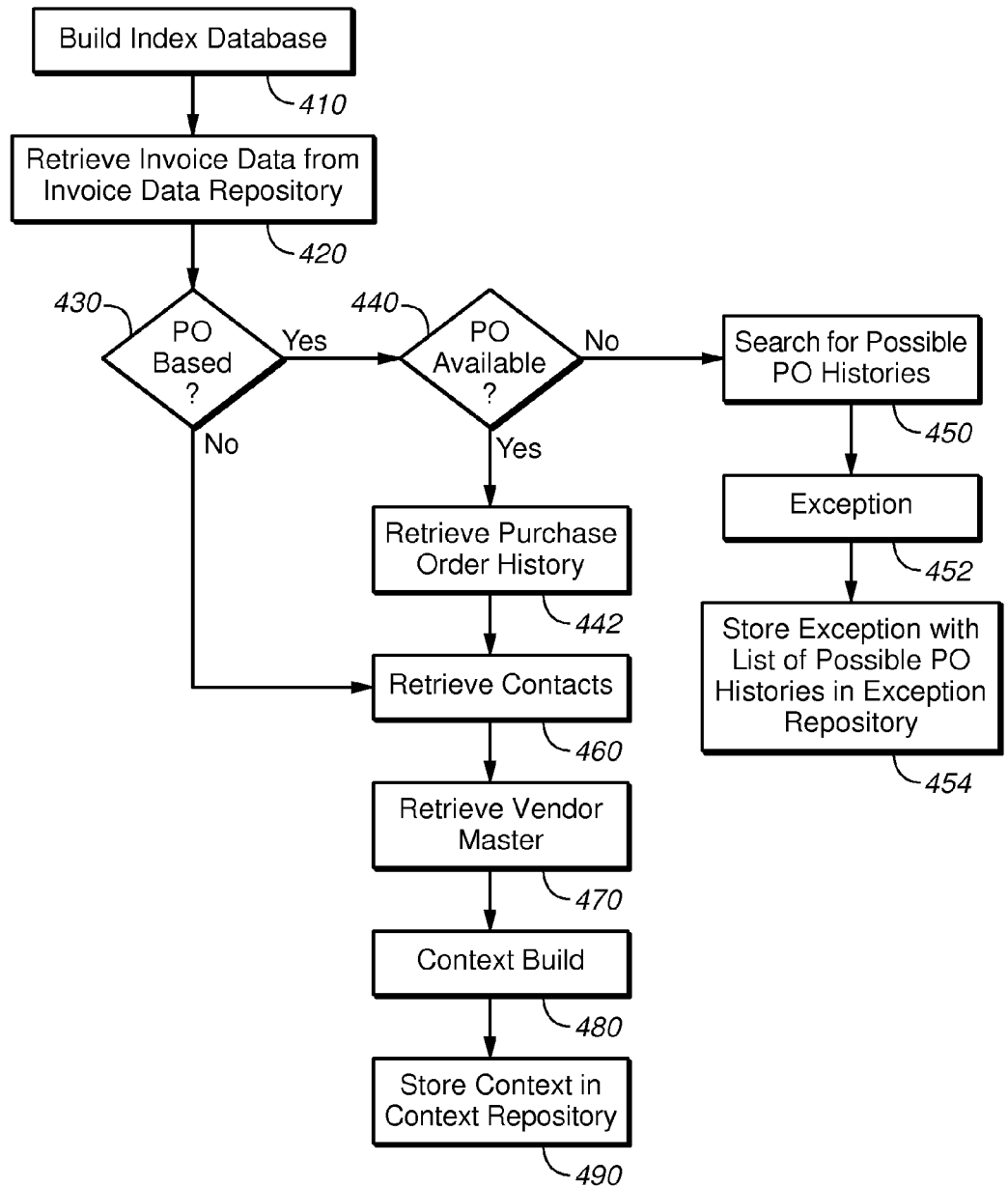
FIG._4

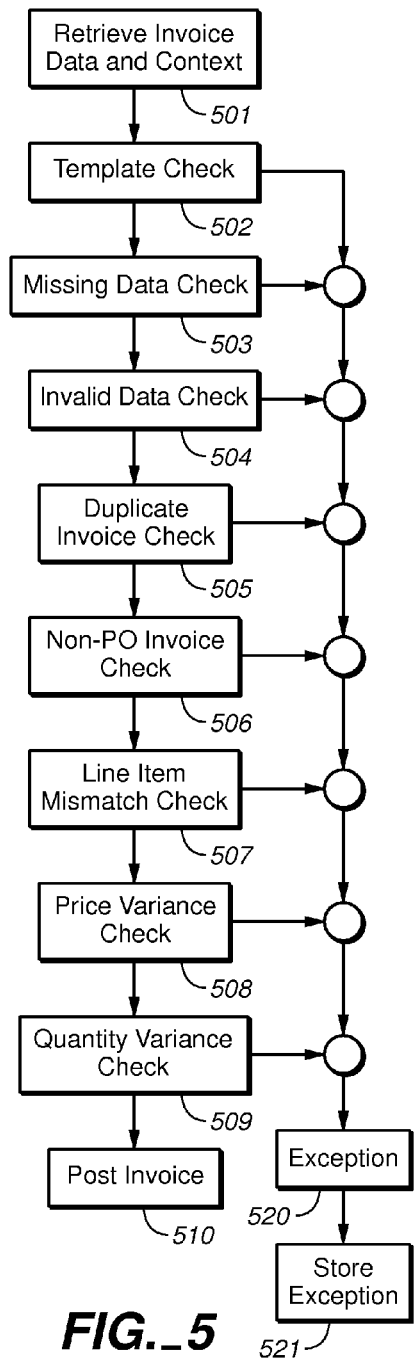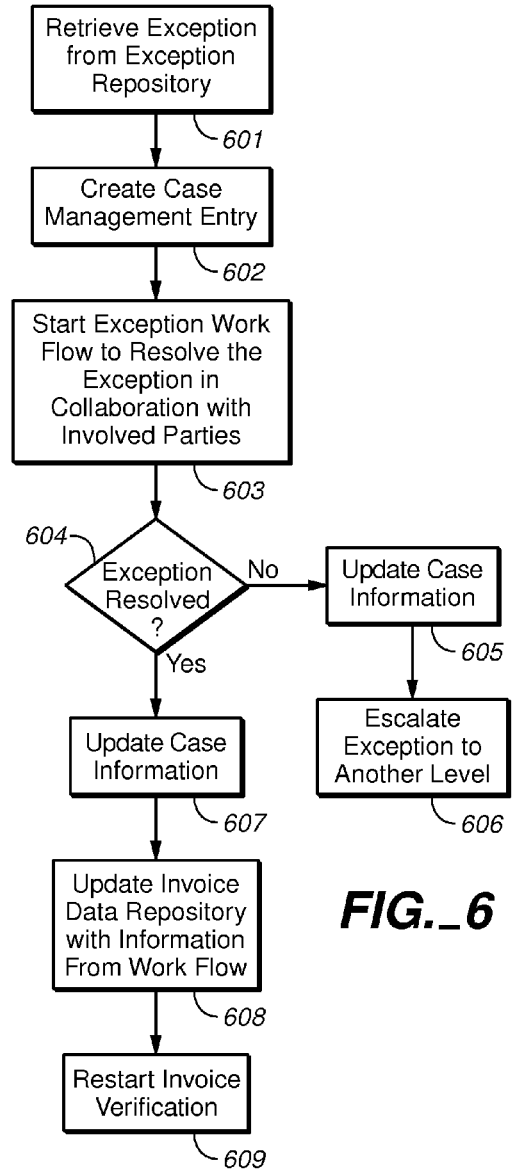
FIG._5
FIG._6

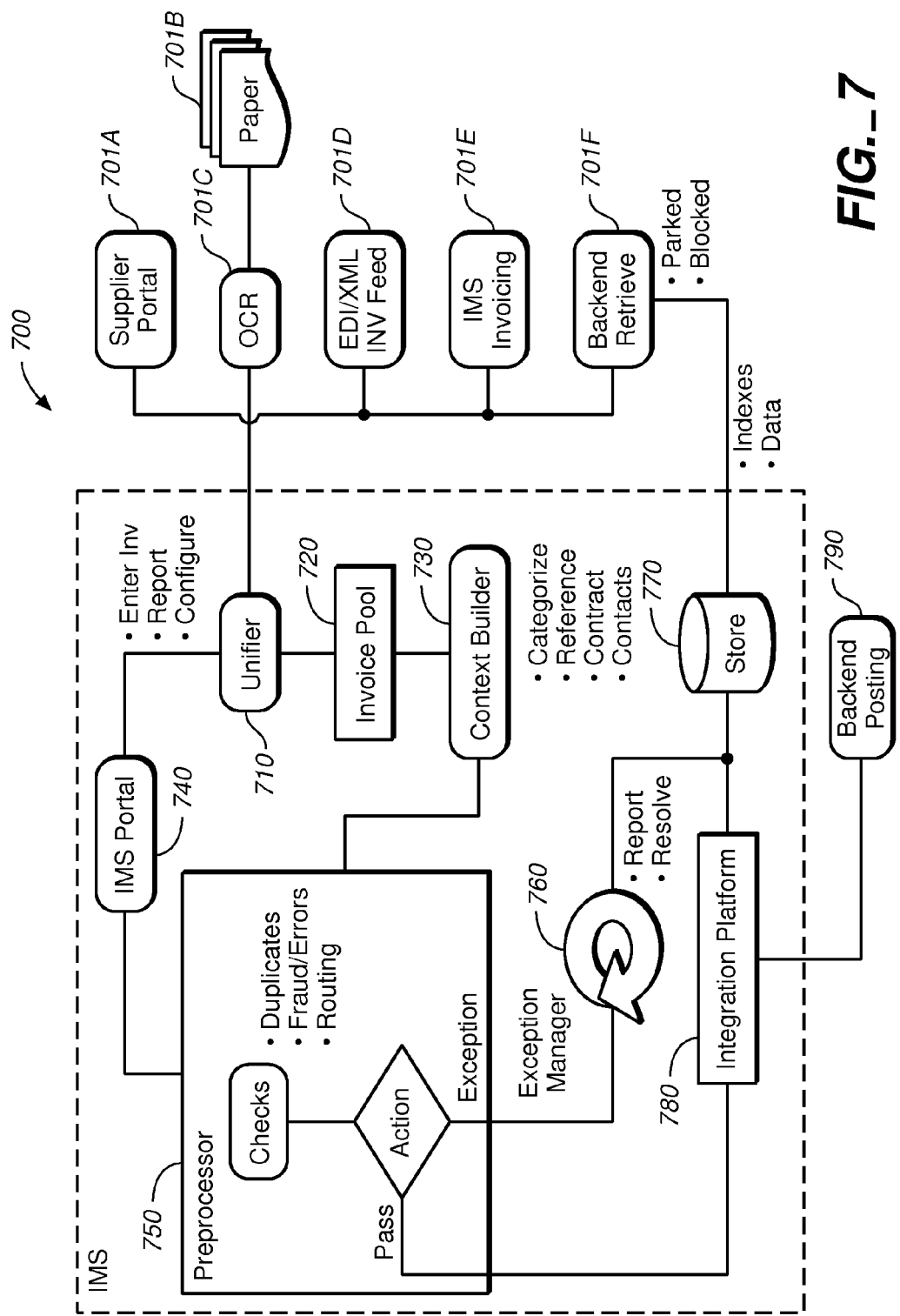
FIG._7

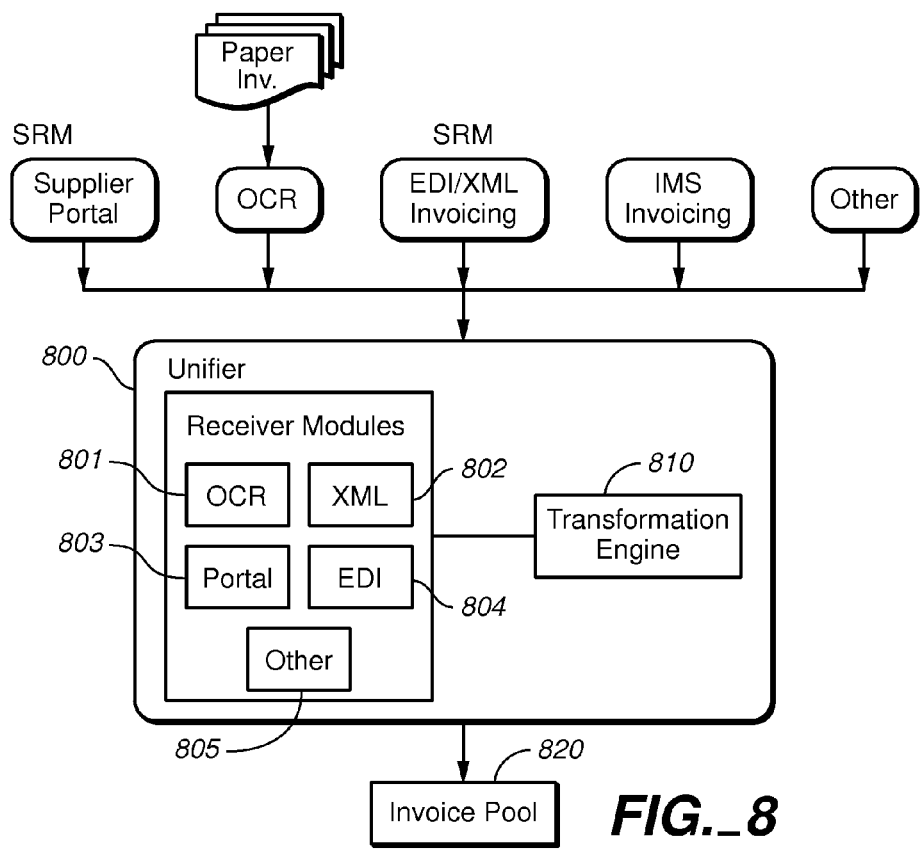
FIG._8
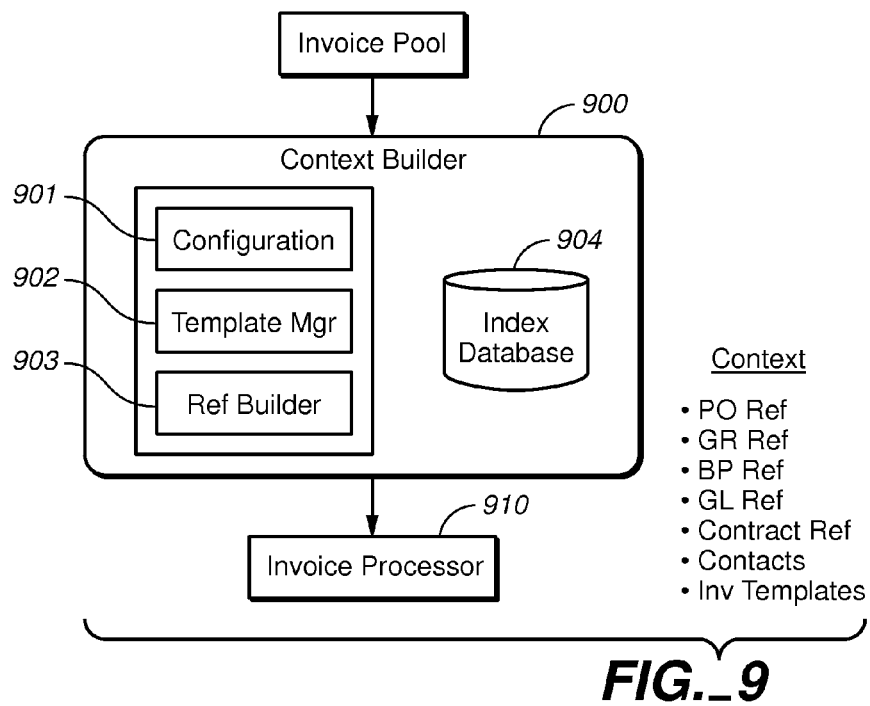
FIG._9

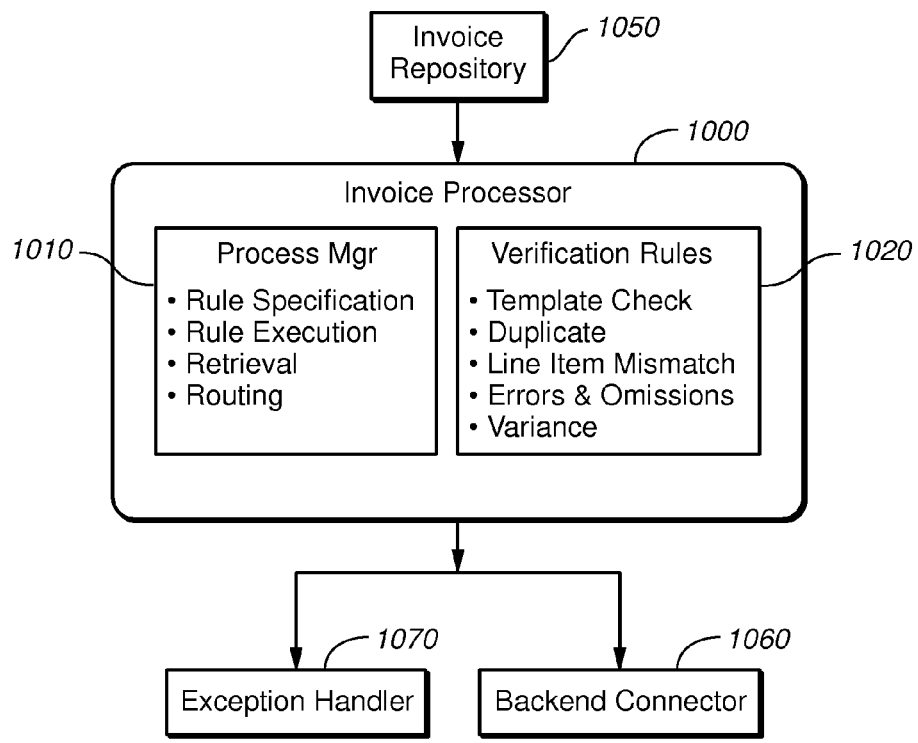
FIG._10
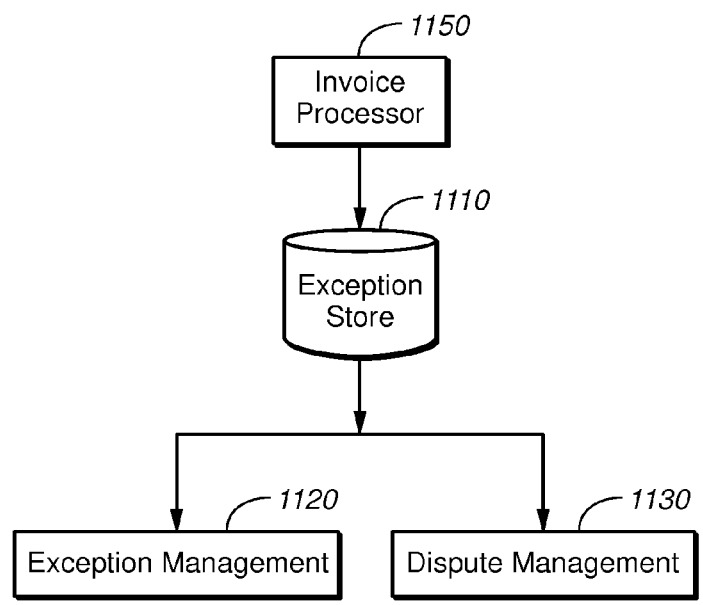
FIG._11

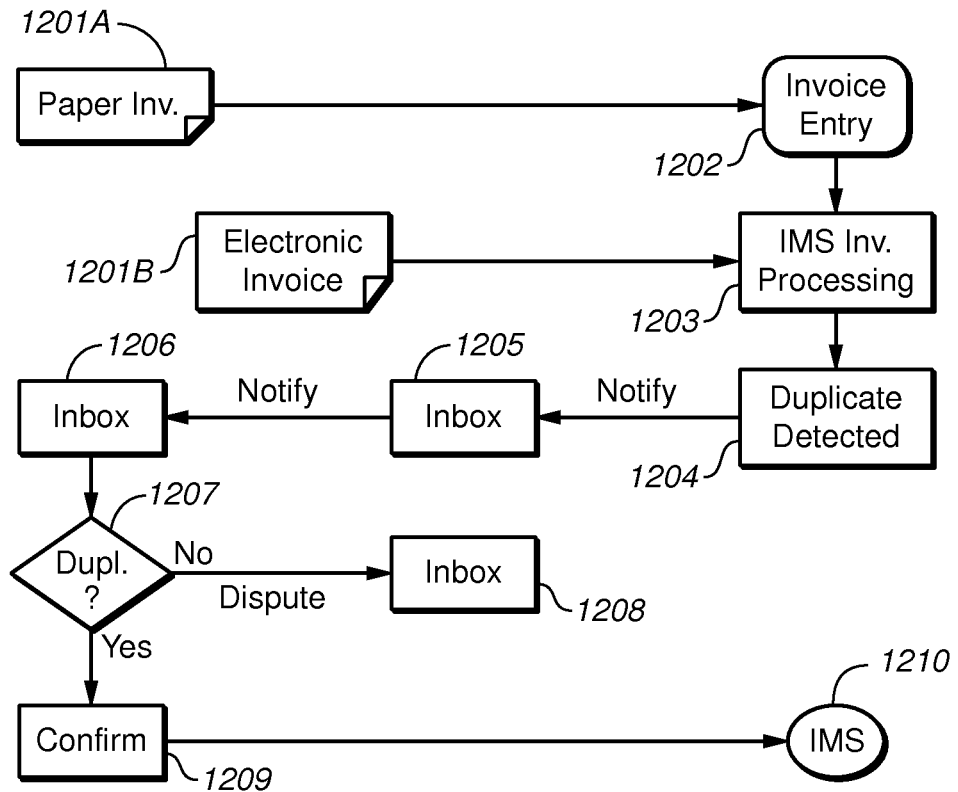
FIG._12

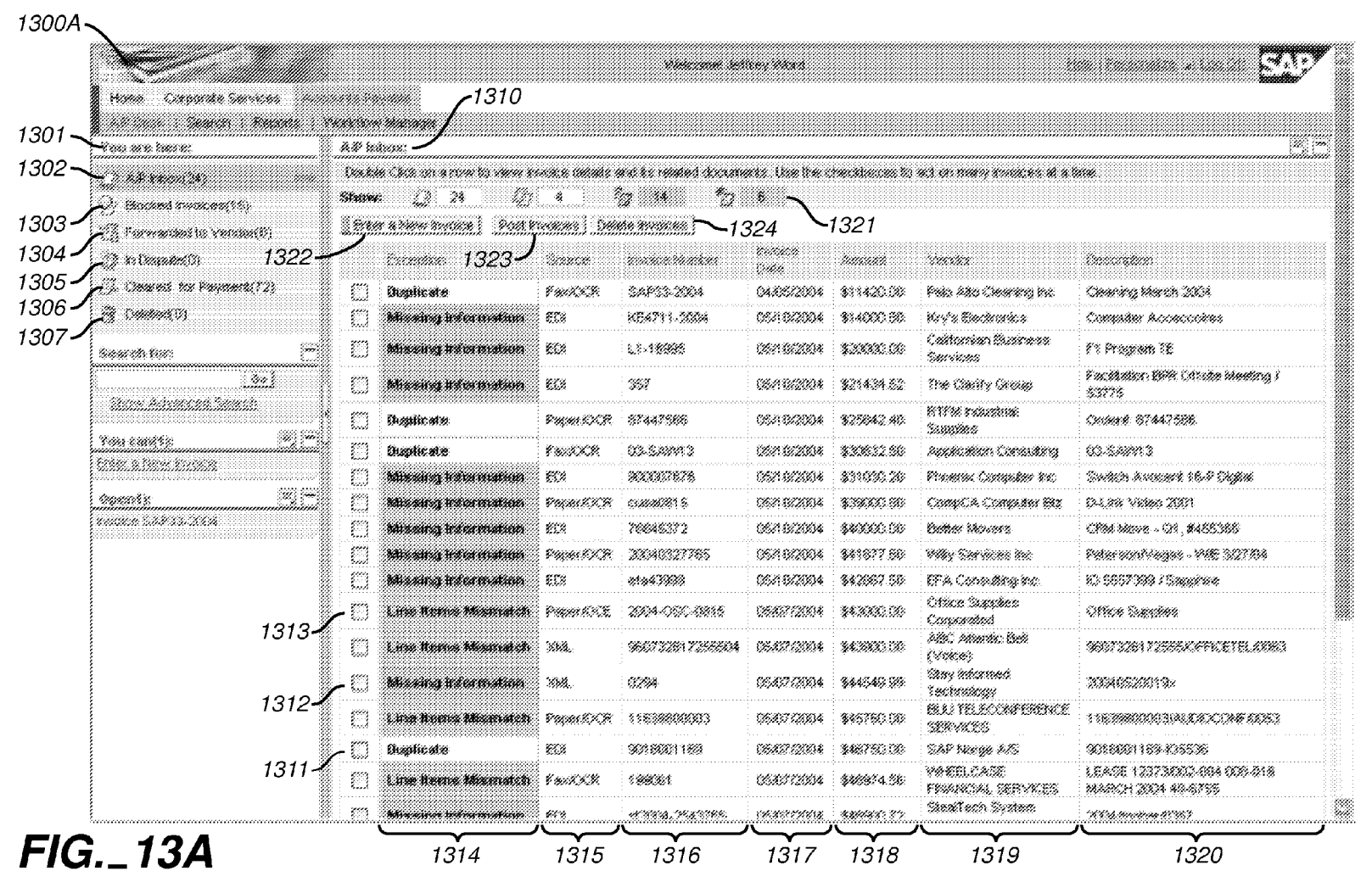

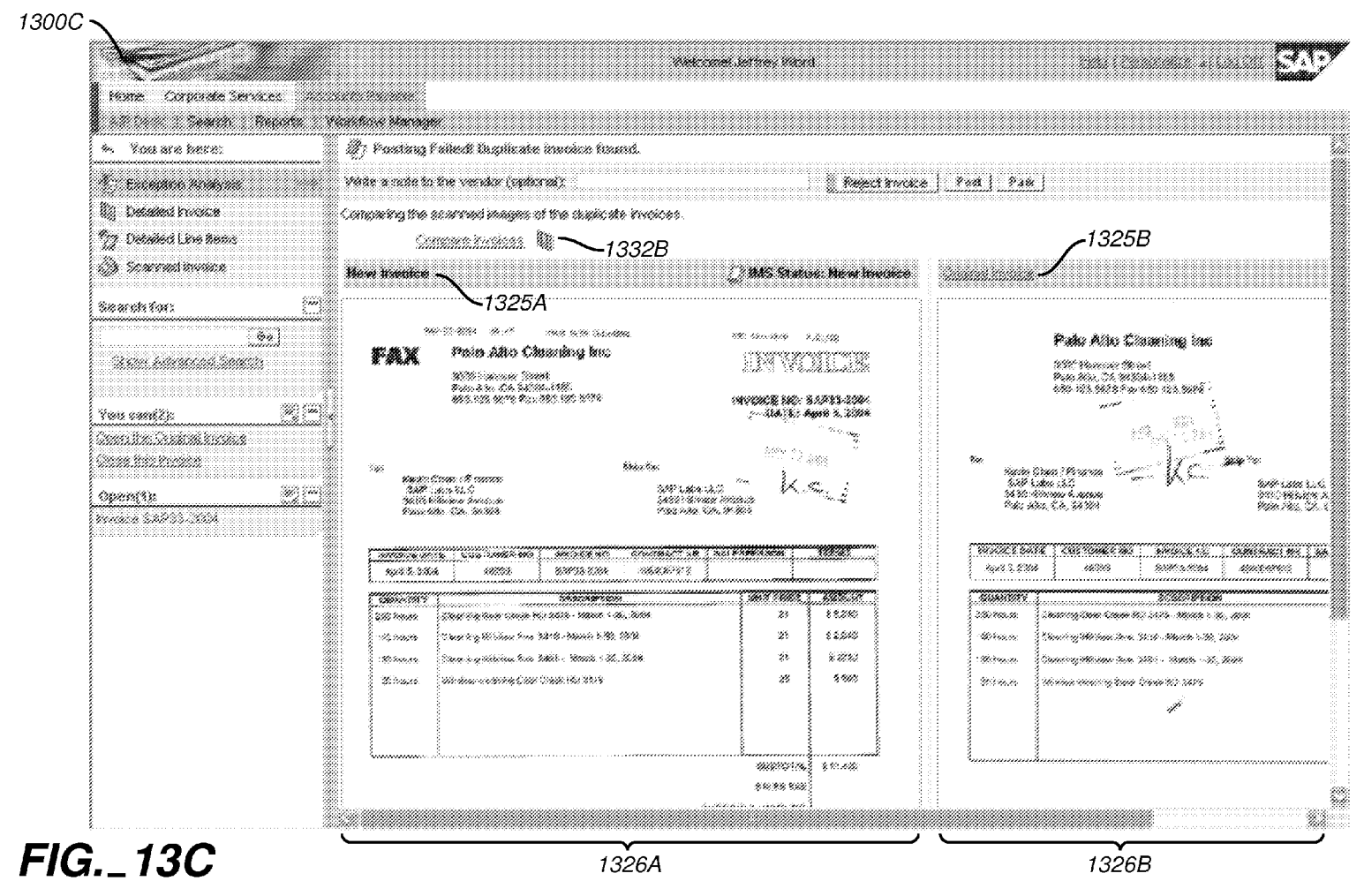

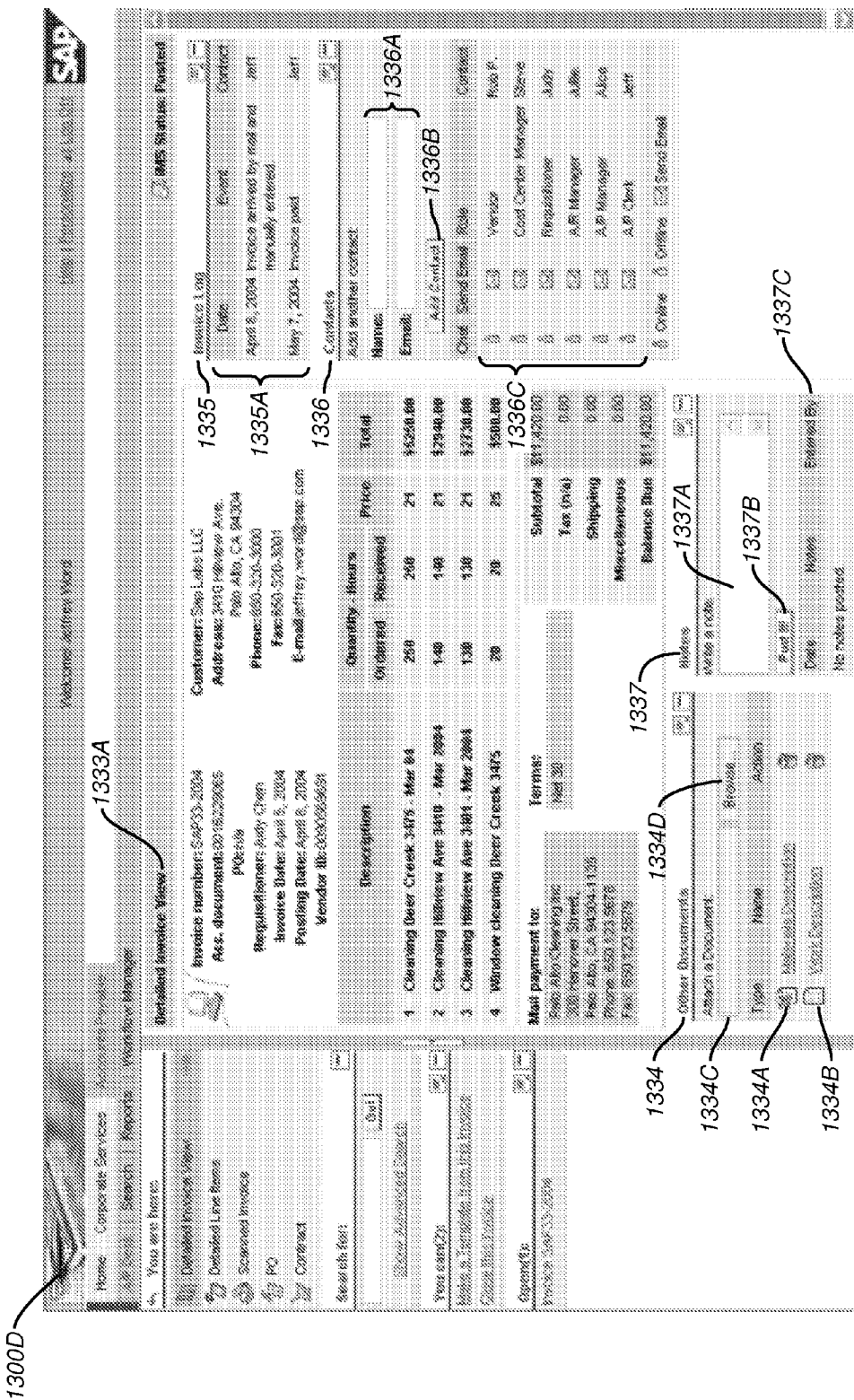
FIG._13D

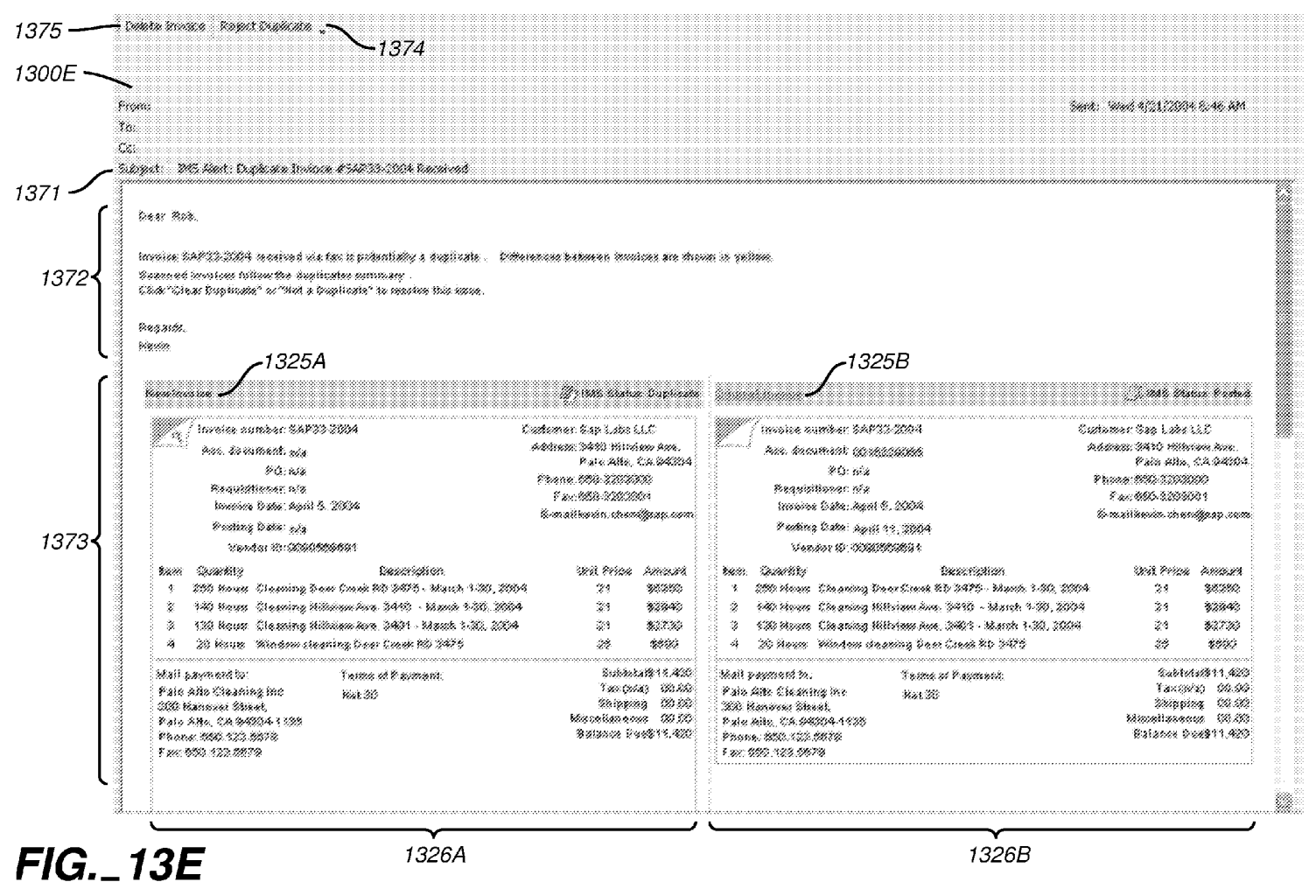

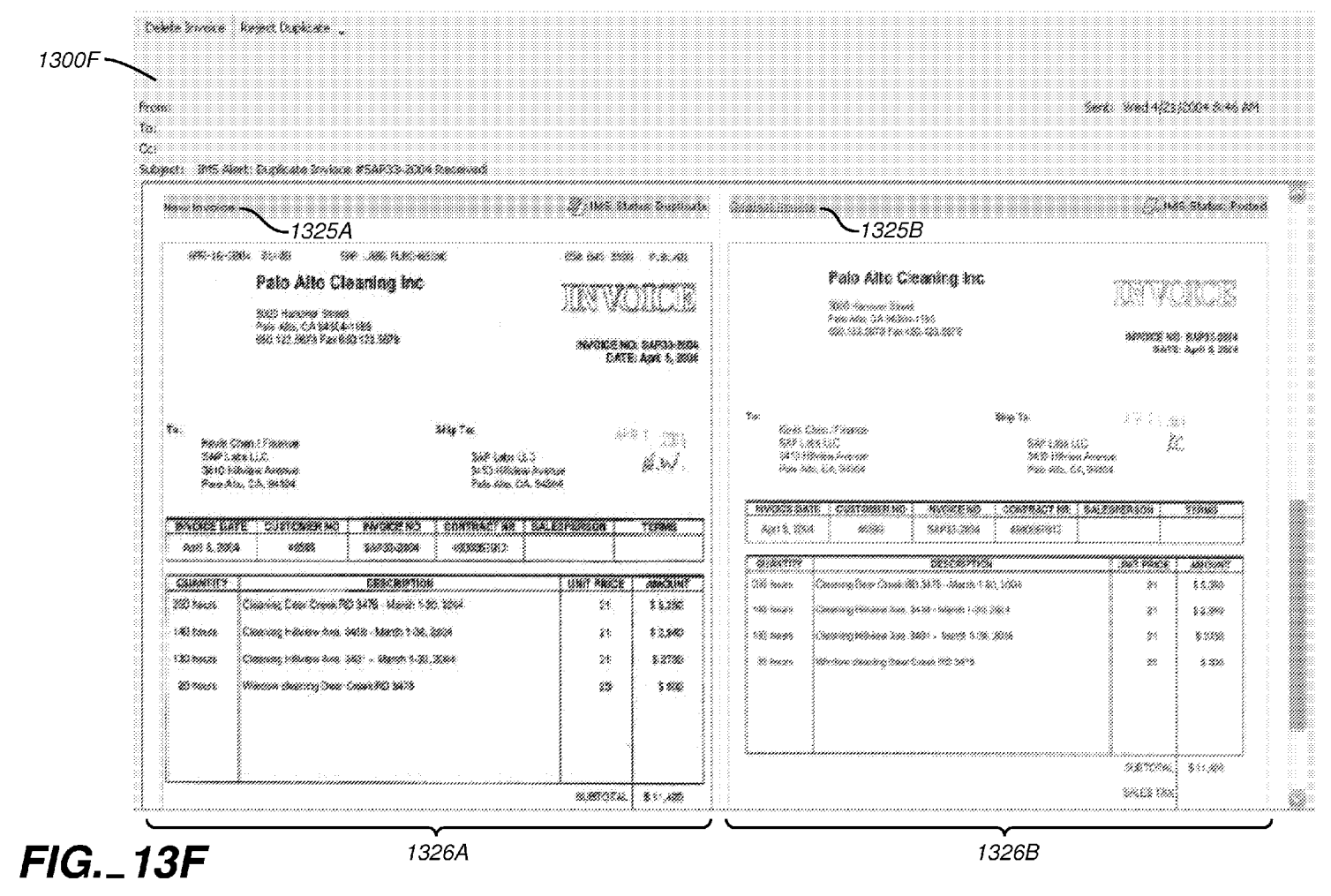

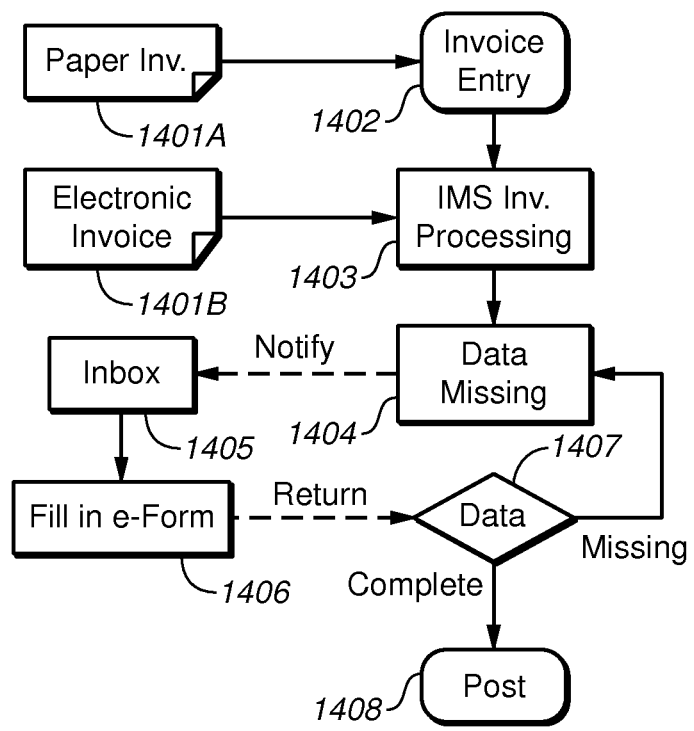
FIG._14

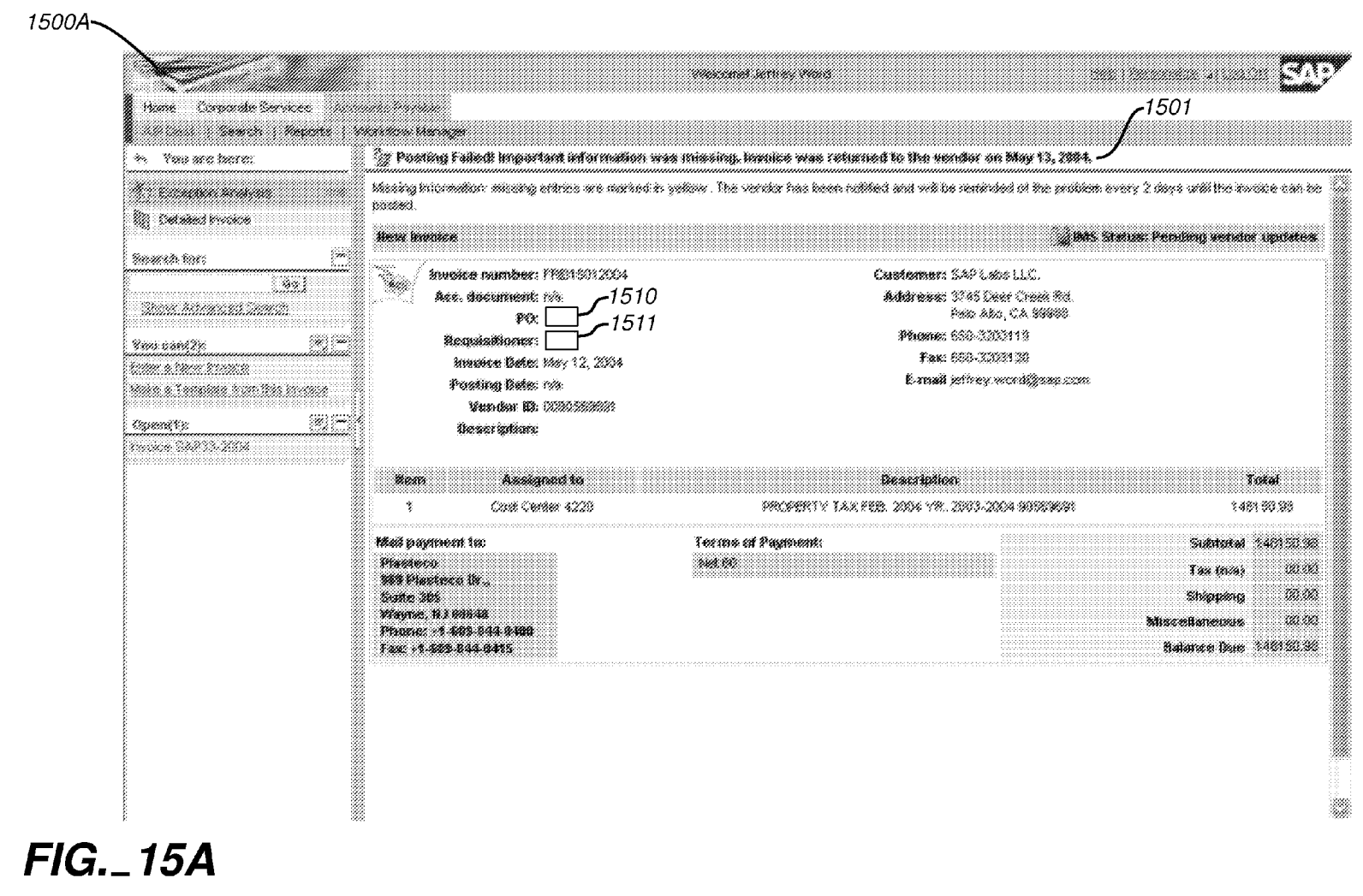

FIG._15A

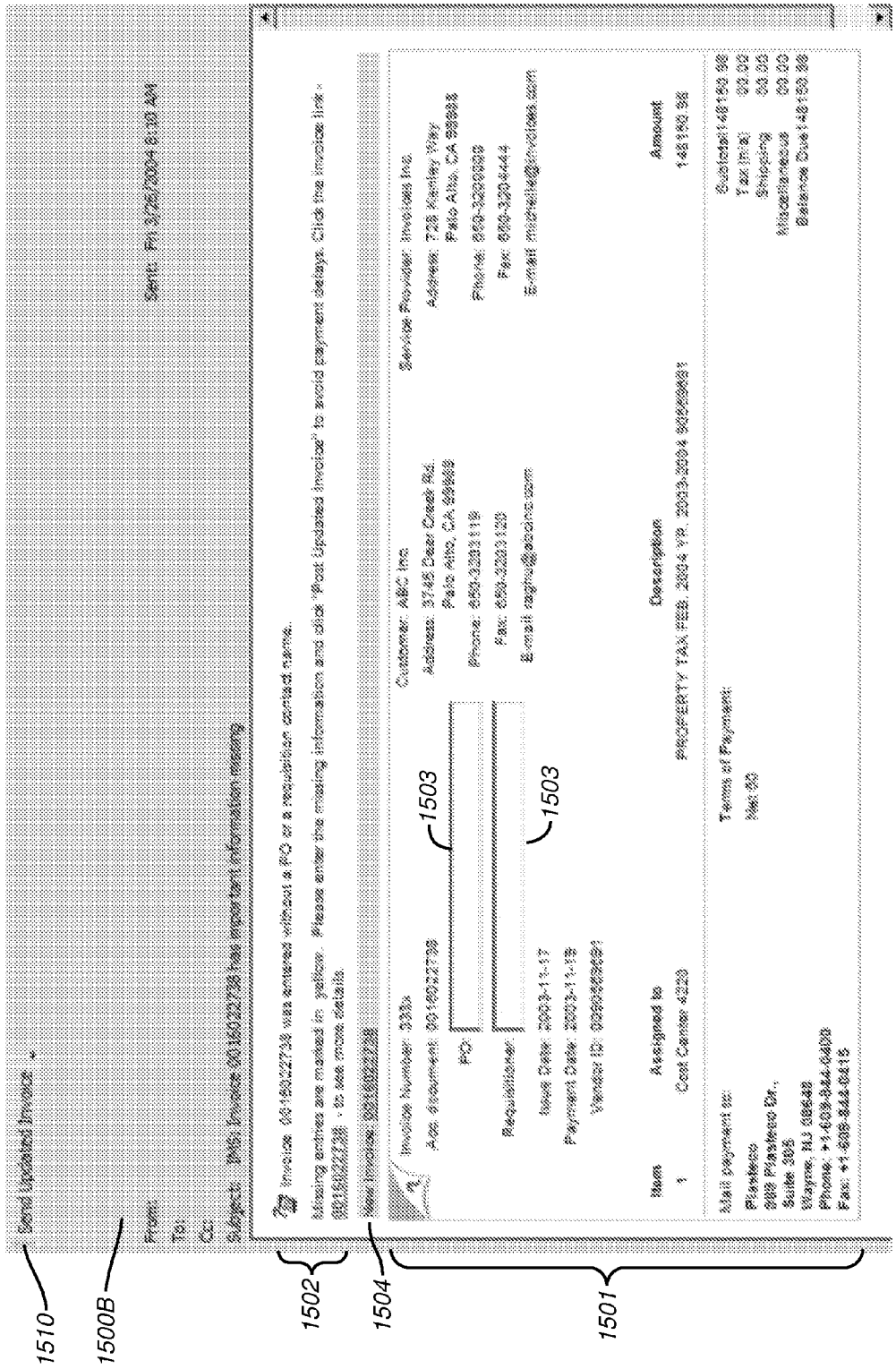
FIG._15B

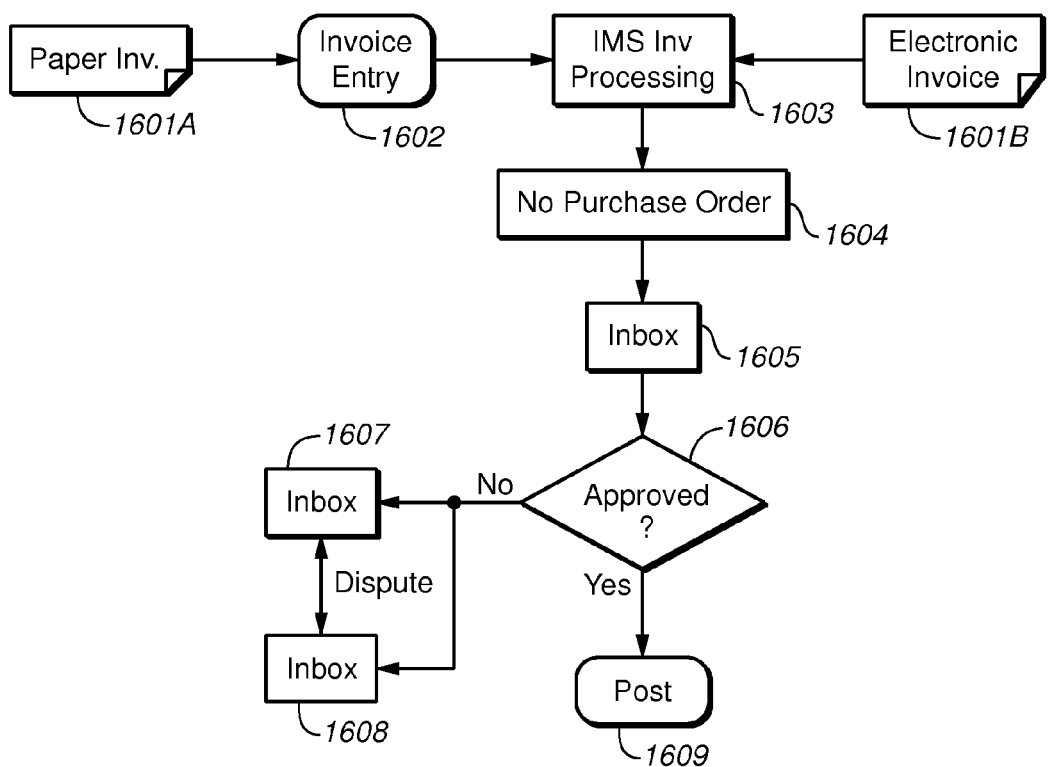
FIG._16

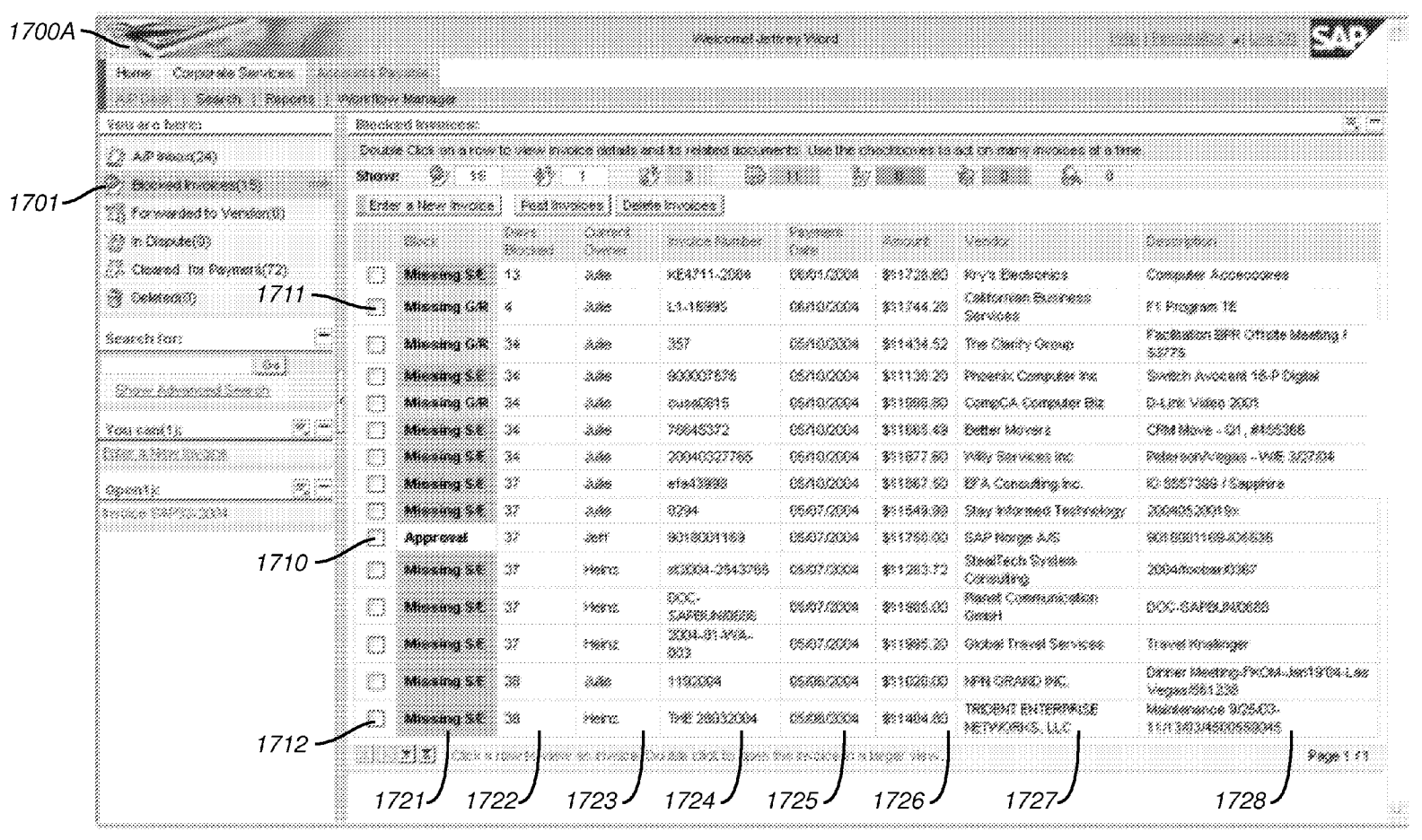

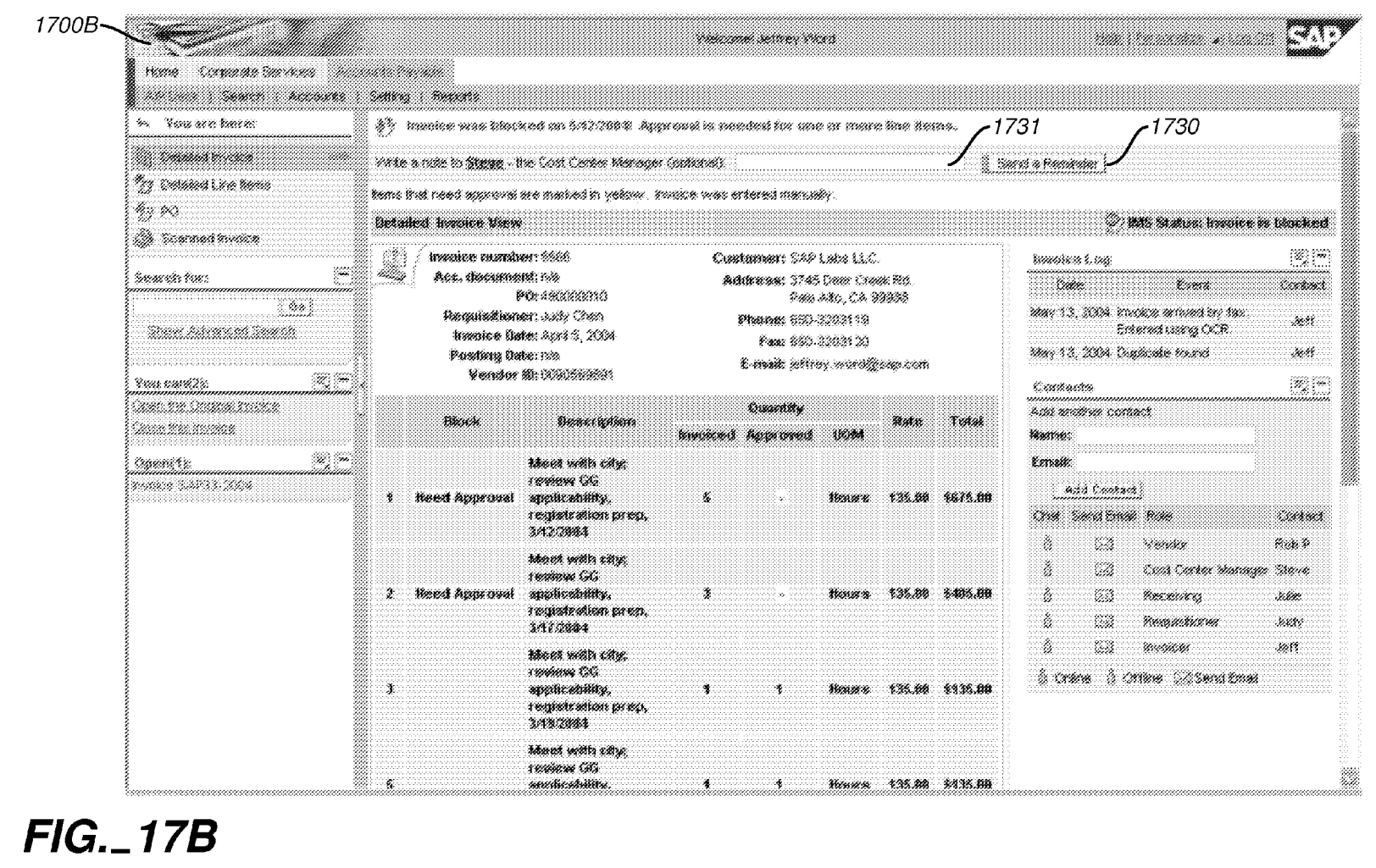

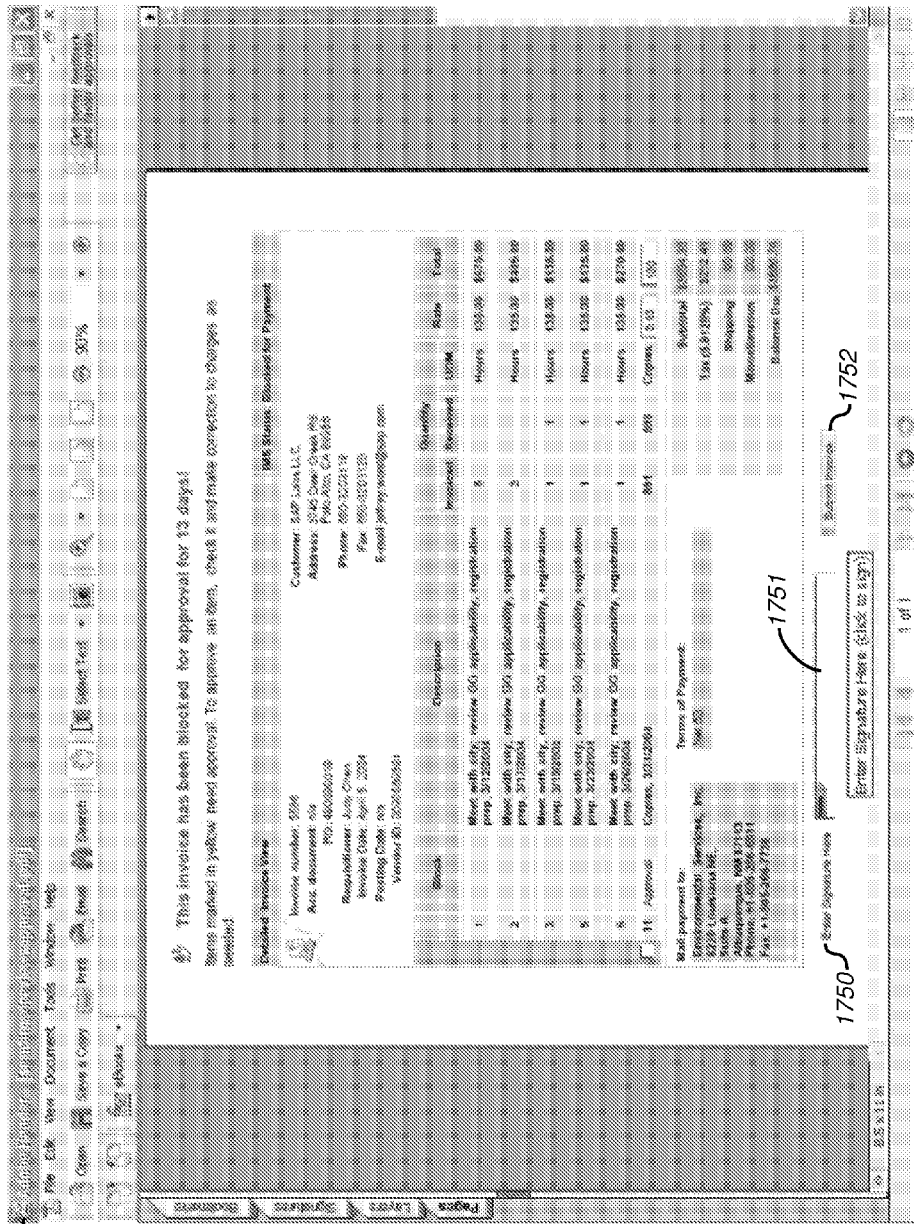
FIG._17C

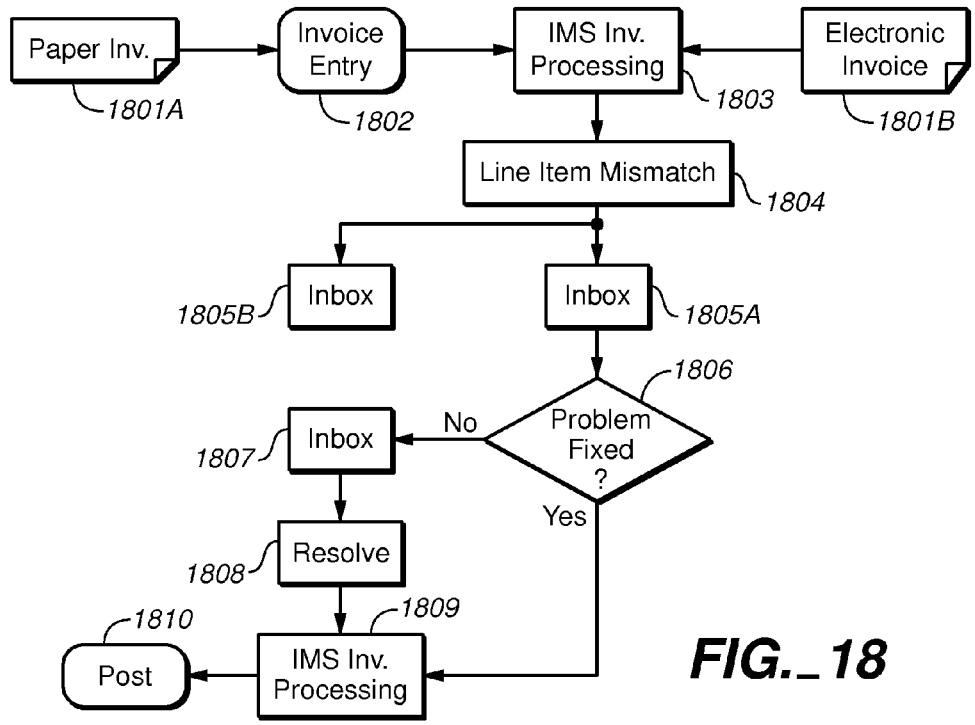
FIG._18
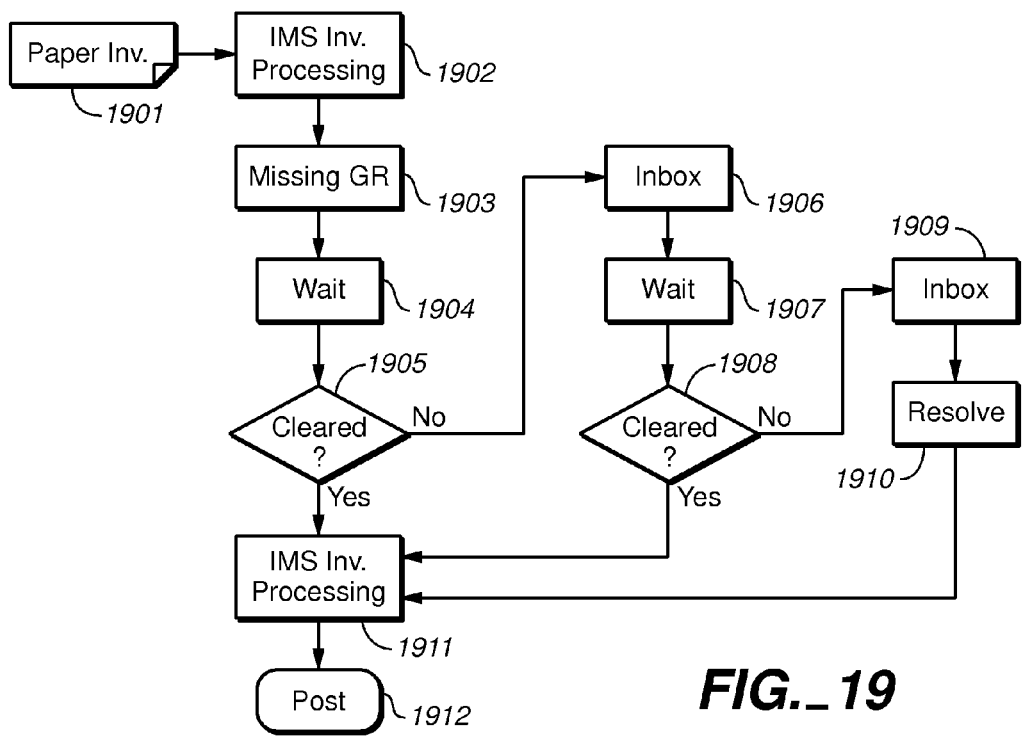
FIG._19

SYSTEM AND METHOD FOR MANAGEMENT AND VERIFICATION OF INVOICES

CROSS REFERENCE TO RELATED APPLICATIONS

This application is a continuation of and claims the benefit of priority from U.S. patent application Ser. No. 10/980,114, filed Nov. 1, 2004, entitled "System and Method for Management and Verification of Invoices."

BACKGROUND

The present invention relates to data processing and data management, and in particular, to a system and method for automated management and verification of invoices and data associated with invoices.

When two entities engage in a business transaction, an invoice is typically generated to capture and memorialize important information about the transaction. For example, an invoice commonly includes a list of goods delivered or services performed, with corresponding prices, quantities, descriptions and charges. As a company grows, keeping track of invoices from suppliers of goods or services (i.e., vendors) can quickly become a difficult task. Different departments within a company may use hundreds or even thousands of different vendors. Furthermore, vendors may send their invoices to different people across the company. Many companies typically have internal or external departments for receiving and processing invoices, but the employees in such departments may have very little information about the nature of the transaction leading to the invoice. Thus, tracking and promptly paying valid invoices, and detecting and correcting erroneous or fraudulent invoices, is a major problem facing today's business community.

To manage and track the flow of invoices, companies often require vendors to associate additional information with each invoice such as a purchase order number, information about which business unit in the company ordered the goods or services, and various tracking and/or reference numbers. Additionally, vendors typically include their name, address and various reference and tracking numbers of their own on their invoices. However, one problem that arises is that the information provided on different invoices can vary drastically from vendor to vendor. Moreover, even if the same information is provided across all vendors, the "format" of the information may be different. For example, the format of the invoice document itself may "look" different because different information is presented in different physical portions of each invoice. As another example, a vendor based in the United States may bill in U.S. Dollars while a vendor based in Germany may bill in Euros. Other problems commonly associated with invoice processing include processing multiple invoices sent by the same vendor for the same job or processing invoices with missing or invalid information, to name just a few. As the size of an organization grows, processing invoices with these and other problems can become economically burdensome because of the increased difficulty for accurate and efficient human processing of invoices.

FIG. 1 is an example of one common approach to automated invoice processing. Typical invoice processing is user-centric, often starting with a user entering data from a vendor's paper invoice 101 into a computer software invoice system 102. Data associated with or relating to an invoice that is stored or processed electronically is referred to herein as "invoice data" (e.g., structured or unstructured data or other electronic information). Once the user has entered invoice data into the system, the program may cross reference a purchase order number against an expected purchase order number. If the purchase order on the incoming invoice does not match exactly with an existing purchase order, the system may indicate that an erroneous invoice has been received. Erroneous invoices are referred to as "exceptions," and typically initiate a manual exception handling process 103. The manual exception handling process may require a company employee to call the vendor at 104 to determine which purchase order corresponds to the particular invoice. Alternatively, the manual exception handling process may require a user to acquire signature authorizations at 105 if, for example, no purchase order was ever assigned to the goods or services received from the vendor.

However, existing user-centric invoice management systems are expensive and highly susceptible to errors. As the number of invoices processed by a company grows, the necessary human interaction may require hundreds or even thousands of employees to manually enter paper invoices and handle exceptions and further processing. Additionally, because human invoice processors are often far removed from direct interaction with the vendor, such individuals are more likely to make a number of different mistakes including overlooking invalid or erroneous invoice data, paying out the same invoice two or more times (i.e., paying on duplicates) or paying out the wrong amount, to name just a few. These and other mistakes and inefficiencies in processing invoices can become very expensive as a company grows.

Thus, there is a need for a system that can process invoices in a way that will improve the efficiency, speed and accuracy of invoice processing over existing techniques. The present invention solves these and other problems by providing an invoice processing system and method for automated management and verification of invoices and the data associated with the invoices.

SUMMARY

Embodiments of the present invention include architectures and methods for automated management of invoices. Embodiments of the present invention may include techniques for receiving and unifying invoice data, retrieving context information about each invoice, verifying each invoice and resolving invoice exceptions. The present invention includes software components for efficiently processing invoices. In other embodiments, the present invention includes methods of processing an invoice.

In one embodiment, the present invention includes an invoice management system comprising a unification software component for receiving invoice data from a plurality of different sources in a plurality of different formats and transforming the invoice data into a common format, an invoice data repository for storing the transformed invoice data, a context builder for automatically retrieving additional information corresponding to the invoice data, an invoice processor for verifying each invoice according to a plurality of rules, and an exception manager for processing each unsuccessfully verified invoice. The invoice management system may further include a index database for performing searches.

In one embodiment, the present invention includes a method of processing invoices comprising storing invoice data corresponding to a plurality of invoices in a repository, automatically searching a plurality of systems for information corresponding to each invoice, and automatically performing a plurality of verification checks on each invoice.

In one embodiment, the present invention includes a method of processing invoices comprising storing invoice data corresponding to a plurality of invoices in a repository, automatically performing a plurality of verification checks on each invoice, creating an exception when at least one of the invoices fails at least one of the verification checks, and processing the exception in accordance with one of a plurality of exception handling procedures.

In one embodiment, the present invention includes a method of processing invoices comprising receiving invoice data from a plurality of different sources in a plurality of different formats, transforming the invoice data into a common format, storing the transformed invoice data in a repository as an invoice, automatically retrieving additional information corresponding to the invoice, and automatically verifying the invoice using a plurality of rules, wherein if the invoice is verified the invoice is automatically posted, and if the invoice data is not verified an electronic exception case is created.

The following detailed description and accompanying drawings provide a better understanding of the nature and advantages of the present invention.

BRIEF DESCRIPTION OF THE DRAWINGS

FIG. 1 is an example of one common approach to automated invoice processing.

FIG. 2A-B illustrate an architecture for an invoice management system according to one embodiment of the present invention.

FIG. 3 illustrates a method of processing an invoice according to one embodiment of the present invention.

FIG. 4 is an example of gathering additional information corresponding to the invoice data according to another embodiment of the present invention.

FIG. 5 illustrates a method verifying an invoice according to another embodiment of the present invention.

FIG. 6 illustrates a method of resolving an exception according to another embodiment of the present invention.

FIG. 7 illustrates an invoice management system according to another embodiment of the present invention.

FIG. 8 is an example of a unifier according to one embodiment of the present invention.

FIG. 9 is an example of a context builder according to one embodiment of the present invention.

FIG. 10 is an example of an invoice processor according to one embodiment of the present invention.

FIG. 11 is an example of an exception manager according to one embodiment of the present invention.

FIG. 12 is an example process flow for resolving an exception according to one embodiment of the present invention.

FIG. 13A-F are examples of a graphical user interfaces for managing invoice exceptions according to one embodiment of the present invention.

FIG. 14 is another example process flow for resolving an exception according to another embodiment of the present invention.

FIG. 15A-B are examples of graphical user interfaces presented for a missing information exception according to another embodiment of the present invention.

FIG. 16 is another example process flow for resolving an exception according to another embodiment of the present invention.

FIG. 17A-C are examples of information that may be retrieved and presented to a user while processing blocked invoices according to another embodiment of the present invention.

FIG. 18 is another example process flow for resolving a line item mismatch exception according to another embodiment of the present invention.

FIG. 19 is another example process flow for resolving a missing goods received exception according to another embodiment of the present invention.

DETAILED DESCRIPTION

Described herein are techniques for managing, verifying and otherwise processing invoice data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Embodiments of the present invention include a software architecture for managing and verifying invoice data. FIG. 2A illustrates an architecture for an invoice management system 210 according to one embodiment of the present invention. Invoices and their associated data are received from multiple distinct sources 200A-200E in different formats. For example, invoices may be received in paper form through traditional channels such as through the postal system, or electronically through a variety of channels such as a web portal, email, or facsimile. If invoices are received in paper or other non-electronic form, an optical character recognizer ("OCR") may be used to translate the data from the paper invoice into electronic form, for example.

Because the present invention allows invoices to be received from different sources, the incoming invoice data is typically received in different formats. For example, invoice data may be received as email text, Adobe® ".pdf" files, text documents, images, extended markup language ("XML"), electronic data interchange ("EDI") or other structured or unstructured, standard or non-standard formats. According to one embodiment of the present invention, invoice management system 210 may include a unification engine 211 that transforms the incoming invoice data into a common format. The step of transforming the incoming structured and/or unstructured invoice data into a common format is sometimes referred to as a "normalization" step. The normalized invoice data may then be stored in an invoice data repository 212 for centralized access and management. In one embodiment, the invoice data is stored in an XML format, which may have a predefined schema (e.g., EBPXML). Of course, other formats could be used. For example, invoices may be stored in table form using relational databases. In other embodiments, invoices may be stored and/or processed as objects (i.e., invoice objects). Invoices may further include references to relevant information stored as tables or objects in other systems (i.e., context).

One problem associated with invoice management and processing is that it is often difficult to effectively process an invoice based solely on the invoice data received from the vendor. Furthermore, the invoice data received from a vendor is often incomplete, incorrect or outright fraudulent. In one embodiment, invoice management system 210 includes a context builder 214 coupled to invoice data repository 212. Context builder 214 may be used to automatically gather additional information corresponding to each invoice, so that each invoice may be processed faster and more efficiently. Context builder 214 may access other data sources both inside and outside the company to gather additional information corresponding to an invoice. For example, context builder 214 may access data in other software systems or applications such as an inventory application 220 or purchasing application 221. Furthermore, context builder 214 may access other structured or unstructured data from other data sources such as network servers, local computers, document repositories or document management systems (to name just a few) to gather information about purchase orders, goods received, business partners, general ledger, contracts and contacts. In one embodiment, context builder 214 may allow users or administrators to specify what other sources or types of additional information may be beneficial for processing invoices (as opposed to programmers). Accordingly, relevant data may be gathered by context builder 214 and used to augment incoming invoice data with relevant context so that the invoice may be processed more efficiently. For example, in one embodiment context builder 214 automatically populates invoice data fields in order to reduce or eliminate data entry by a human user. Additional features and functionality may be incorporated into context builder 214 as described below.

Invoice management system 210 further includes an invoice processor software component 213 coupled to both invoice data repository 212 and context builder 214. Invoice processor 213 may use data from invoice data repository 212 and the data gathered by context builder 214 to automatically verify the invoice data. For example, invoice processor may perform checks for duplicate invoices, errors & omissions, fraud, and routing errors. If the invoice data is verified successfully, the invoice data may be posted in a financial application 250, for example. However, if the invoice data is not verified, an exception manager 215 may be invoked to report problems to relevant personnel and control the resolution of the problem.

In one embodiment, exception handler 215 provides functionality to control the processing of invoice exceptions and may further facilitate collaborative resolution of invoice problems. One advantage of the present embodiment is that exception handler 215 may act as a single point for capturing and processing of exceptions and for automating the dispute resolution process using collaborative tools. For example, in one embodiment all exceptions are stored in an exception repository (not shown) for centralized management and an "exception case" may be created by the system. The system may intelligently forward the exception case to different individuals in the company or external individuals if a particular individual's participation is necessary for resolution of the exception. The information transferred between individuals may be intelligently controlled so that each individual only receives the information necessary for solving particular problems. For example, exception manager 215 may forward information about the exception to users in different groups in company 230 such as accounts payable 230A, purchasing 230B, requisitions ("REQ") 230C, cost center management ("CCM") 230D or goods received ("G/R," e.g., a manufacturing facility) 230E if the participation of employees in those groups is required to resolve the issue. Exception manager 215 provides flexible automated collaboration between such users and the vendors associated with each invoice. For example, in one embodiment exception manager 215 manages notifications pertaining to exceptions between one or more employees in the company 230 and employees at a vendor 240. Vendor 240 may receive invoice information corresponding to an exception case from a user over email along with comments and an optional interactive form. Vendor 240 may then dispute the exception (e.g., if the exception pertains to a duplicate or fraudulent invoice), confirm the exception or provide additional information via the interactive form, for example. Once the exception is resolved, the exception case is closed and the invoice data may be posted.

Invoice management system 210 may further include a search engine including, for example, a search index 216 that may be accessed by invoice processor 213, context builder 214 and exception manager 215. Invoice processor may use search engine capabilities to access the search index to search for invoice information in the same system or other systems. For example, an index of processed invoices may be maintained, and a search through the index may be made as new invoices enter the system (e.g., for duplicate detection). The index may be a combined subset of multiple database tables that includes a variety of invoice data. Simple checks for the same date or same amount may be performed by a simple database search. However, more complex searches such as "similarity searches" may be performed to find invoice data or context for an invoice. In one embodiment, information may be retrieved using similarity search techniques disclosed in commonly-owned concurrently filed U.S. Pat. No. 7,734,566 B2 entitled "Information Retrieval Method with Efficient Similarity Search Capability," naming Alexandru M. Caracas, Tobias Niekamp and Sascha H. Schmitt as inventors, the contents of which is hereby incorporated herein by reference in its entirety. Context builder 214 may access the search index 216 for searching for additional information about the invoice. Finally, exception manager 215 may access the search index to allow users to search exception cases or context as described below. Search functionality may also be supplied to users during exception management.

Invoice management system 210 may further include an integration layer as shown in FIG. 2B. Integration layer 260 may include one or more code modules that interface with other systems or people that are involved in invoice processing. Integration layer 260 enables the system to exchange data (e.g., posting, accessing context or parking) and perform actions such as sending confirmations, requesting input, obtaining authorizations or running invoice queries to name just a few. Integration layer 260 includes software components that allow invoice management system 210 to provide communications (e.g., email) between internal company employees 261. Integration layer 260 may also support electronic communication with and access to information in other software systems and applications 262. Finally, integration layer 260 includes software components that allow invoice management system 210 to provide communications (e.g., email) between internal company employees 261 and vendor employees 263.

FIG. 3 illustrates a method of processing an invoice according to one embodiment of the present invention. At 310, invoice data is received from different sources and typically in different formats. For example, the invoices may be received in XML, EDI, IDOC or an OCR format. At 320, the invoice data is transformed into a common format. At 330, the transformed invoice data is stored in a repository. In one embodiment, the invoice data is stored in an XML format, which may have a predefined schema (e.g., EBPXML). Of course, other formats could be used. At 340, the system automatically retrieves context information corresponding to each invoice. In one embodiment, invoice data is automatically populated when additional information about the invoice is retrieved. At 350, the invoice data is automatically verified. If the invoice data passes verification at 360, the verified invoice data is posted. If the invoice data does not pass verification, an exception is automatically created and one or more users are notified at 370.

FIG. 4 is an example of retrieving context information corresponding to the invoice data according to one embodiment of the present invention. At 410, a search index is created so that relevant information corresponding to invoice data (i.e., context) may be accessed. Examples of context information that may be used to augment invoice data may include purchase order, purchase order history, goods received, services rendered, requisitions, shipping notices, delivery notices, contracts, business partner information, contact information and related information. Context information may further include vendor master data such as the vendor's name, address, phone numbers, fax numbers and bank information, for example. Context information may be accessed using an index repository for accessing the information remotely, for example. Alternatively, the context information may be stored directly in a context repository or stored in the invoice data repository if the information is used to automatically populate invoice data fields. In the present example, the existence of a purchase order ("PO") is determined prior to retrieval, which is advantageous but not necessary. For example, at 420 invoice data may be retrieved from the invoice data repository. At 430, the system checks to see if the invoice is based on a purchase order. If an invoice is based on a purchase order, the system will determine whether or not the purchase order is included in the invoice data at 440. If no purchase order number is included in the invoice data, the system will automatically search for possible purchase order histories at 450, and an exception case is created at 452. The exception is stored with a list of possible purchase order histories in an exception repository for ultimate resolution by a user at 454. If the invoice data includes a purchase order, the purchase order history is retrieved at 442. Further information such as contact data and vendor master data may also be retrieved at 460 and 470. At 480, the retrieved data is associated with the invoice data (i.e., a "context" is built) to help users resolve exceptions should they occur. At 490, the context may be stored in a context repository.

FIG. 5 illustrates a method verifying an invoice according to another embodiment of the present invention. At 501, invoice data is retrieved from the invoice data repository. Context information may also be retrieved. One advantage of this embodiment is that an invoice will be automatically posted without user intervention if the system can verify that the invoice data meets numerous predefined criteria. For example, the system may use the invoice data to perform a template check 502, a missing data check 503, an invalid data check 504, a duplicate invoice check 505, a non-purchase order check 506, a line item mismatch check 507, a price variance check 508 and a quantity variance check 509. Other verifications may also be included such as an authorization check, missing goods received ("GR") check and/or a missing service entry ("SE") check. If all of the invoice data is verified, then that invoice is posted at 510. If any of the checks are not successful, then an exception is created at 520. The exception may be stored in an exception repository at 521 for later access by a user.

FIG. 6 illustrates a method of resolving an exception according to another embodiment of the present invention. At 601, the data associated with the exception is retrieved from an exception repository. At 602, a case management entry may be created to facilitate automated tracking of each exception. In some embodiments, the case management entry may be created by the invoice processor when an invoice fails a verification check and the exception is created (i.e., prior to step 601). At 603, one of a plurality of different exception work flows (i.e., exception handling procedures) may be initiated to resolve the exception. Embodiments of the present invention may include a variety of different exception work flows. In one embodiment, different work flows may be started based on the type of error that triggered the exception. In other words, the particular exception handling procedure initiated by the system may be based on the particular verification check that the invoice failed. For example, a failed duplicates check may lead to a different work flow than a failed template check or failed missing data check. These exception work flows may require collaboration with other involved parties, such as one or more of the vendor's employees or one or more of the company's employees. Exception work flows may also be role based so that the system controls who is contacted to resolve different types of problems. Additionally, the system may control how users are contacted (e.g., over email, through a web portal or through an "Inbox" described below). Moreover, the system may control the information each user receives. Some exceptions may require only a subset of the invoice data for resolution. The information may be filtered based on the type of exception or the role of the user (i.e., some users may not require certain invoice data to resolve an exception). At 604, the system determines whether or not the exception was resolved. If the exception is not resolved, case information is updated (e.g., in the case management database) at 650. At 606, the exception may be escalated for further processing (e.g., by alternate work flows or human intervention). If the exception was resolved, the case information is updated at 607 and the invoice data repository is updated at 608 with information obtained as a result of the exception work flow. At 609, the invoice verification may be restarted. Alternatively, if the verification process detects multiple invoice errors, multiple exceptions may be processed and resolved in parallel.

FIG. 7 illustrates an invoice management system 700 according to another embodiment of the present invention. Invoice management system 700 ("IMS") includes a unifier 710, invoice data repository 720, context builder 730, IMS portal 740 (e.g., a web based interface), invoice processor 750 (sometimes referred to as a "preprocessor" because it is performing the processing prior to posting), exception manager 760, STORE 770 (which may represent a plurality of different databases used by the IMS for different purposes), and an integration platform 780. Invoices may be received electronically from a supplier portal 701A (e.g., a specific portal for registered vendors), paper invoices 701B (e.g., invoices that have been processed by an optical character recognizer 701C), an EDI or XML feed 701D, IMS invoicing 701E (e.g., a manual entry component of the IMS), or a backend retrieval system 701F (e.g., a component that retrieves the invoice data from other proprietary systems). Unifier 710 receives incoming invoice data from a plurality of different sources and in a plurality of different formats and transforms the data into a common format. The transformed invoice data is then stored in invoice pool 720 (e.g., an invoice repository). Context builder 730 automatically retrieves additional information corresponding to each invoice. Context builder 730 may associate a category, references, contacts, contracts or histories with each invoice data entry. Invoice processor 750 automatically verifies each invoice. For example, invoice processor may perform checks for duplicates, fraud or a variety of other checks including those disclosed above and shown in FIG. 5. Invoice processor 750 then forwards the invoice for further processing including posting the invoice if the invoice passes verification or creating an exception if the invoice fails verification and triggers an exception. Exception manager 760 automatically manages exceptions. Integration platform 780 allows the IMS system to interface with other software systems, such as a backend posting system 790 or third party financial or related legacy systems (not shown), and provides for communications between individuals using email, for example.

FIG. 8 is an example of a unifier according to one embodiment of the present invention. Unifier 800 converts different incoming invoice data formats into one common format and stores the data in invoice repository (i.e., invoice pool) 820 for use in later processing steps. In one embodiment, invoice repository may be used as a temporary storage area for queuing invoice data prior to verification in the invoice processor. Unifier 800 may include different software components (i.e., receiver modules) for receiving data from different sources (e.g., external sources). Receiver modules may include software for receiving invoices from an optical character recognizer ("OCR") 801, XML 802, Portal 803, EDI 804 and other components for receiving data from other sources represented by module 805 ("other"), which may include customizable receiver modules that may be created and customized dynamically to meet different user requirements. Unifier 800 may further include a transformation engine 810 for transforming the invoice data into a common format. Alternatively, each receiver may be responsible for applying the appropriate transformation and produce invoice data in the preferred common format, which is then stored in the invoice pool 820. In one embodiment, if a received input data is incorrect and cannot be transformed by the corresponding receiver, then error messages are generated and the input is ignored. On the other hand, if the input is successfully transformed, then an acknowledgement may be generated indicating that the input was received and is pending verification. Additionally, embodiments of the present invention may log the status of each received invoice to support status checking.

FIG. 9 is an example of a context builder according to one embodiment of the present invention. Context builder 900 provides additional information to invoice processor 910 and exception manager (not shown) that is relevant to verification and exception resolution. The context builder may access a variety of other systems including backend systems. Context builder 900 includes a configuration software component 901, a template manager software component 902, and a reference builder software component 903. The context builder may include, or be coupled to, an index database 904 for accessing context information. Configuration 901 may indicate to the IMS system what other systems to access, how to access such systems and what information to retrieve. For example, configuration component 901 may include information about what other systems are available within a company for accessing context (e.g., an employee database, vendor database or financial application to name just a few possibilities). Configuration component 901 maintains certain information that may be required in order to gain access to the information in these other systems, such as security information, passwords, user ID, addresses or related information. Configuration component 901 may also control what information needs to be retrieved from each system. Reference builder 903 accesses configuration component 901 and builds an index database 904 for accessing the context information.

Exemplary context information may include document context, organizational context and people context. Document context may include the purchase order associated with an invoice, the requisition upon which the purchase order was based, the blanket order (e.g., a contract) that the purchase order refers to or relates to, goods receipts associated with the invoice, service confirmations, payment information for invoices that have been posted, prior invoices for the purchase order associated with the invoice, advanced shipment notifications associated with the invoice, bills of lading for goods received or links to scanned versions of all such structured or unstructured documents. Organizational context may include the purchasing group responsible for the purchase order, the purchasing organization, the plant(s) referred to in the line items of the purchase order, the cost centers, projects, work orders or assets for which the purchase order was created, for example. People context may include the purchasing agent, the supplier contact for the purchase order, the requisitioner, the receiving clerk, the person responsible for the cost center, project, work order, or asset, or the accounts payable clerk that processed a previous invoice.

The context builder may be used to autopopulate invoice data. First, the system may search an incoming invoice for a purchase order number. From the purchase order number, the system may use the index database to access the PO. From the PO, the system searches for the purchase requisition ("PR"), and from the PR the system can acquire the requisitioner. Once the system knows the requisitioner, the system can search for the requisitioner's cost center by accessing employee reference (e.g., an human resources database) and populate the cost center automatically. For an approval workflow, the system searches for hierarchical information for the requisitioner's organization and send email to his manager automatically. Of course, the above described process is just one example of how autopopulation may be carried out. Autopopulation algorithms and rules may be defined and altered in accordance with different system requirements. Thus, context may be gathered from across a wide range of information sources, and the information from one or more sources may be used to access yet further information to gather relevant context and autopopulating the fields of the invoice.

Embodiments of the present invention also support invoice templates, which may be managed by template manager 902. Invoice templates allow a user to define characteristics of incoming invoices (e.g., for a particular vendor) based on historical transactions. An invoice template may include a collection of characteristics that a user may look for when an invoice enters the system. Invoice templates may include a plurality of fields that have predefined values (e.g., the vendor's name, identification number, address or other characteristics relating to that vendor that do not change from invoice to invoice). As invoices enter the system, a template (e.g., corresponding to a particular vendor) may be accessed and compared to the incoming invoice. When a template field has a value, each incoming invoice must have that same value in the corresponding field. For example, when an invoice is received and transformed, the system may determine who is sending the invoice by examining the name and/or vendor number. Next the system may access a template corresponding to the particular vendor and compare one or more templates to the invoice. By comparing the templates predefined characteristics of the invoice to the incoming invoice, the system can determine whether or not there is a variance in an incoming invoice from previously received invoices. Embodiments of the present invention also include templates having one or more fields with a range. In this case, when an invoice is compared against the template, the value of the field in the invoice must be in the range specified in the template. Templates may also include lists of values (e.g., multiple addresses). In this case the invoice must have a value from the template list in a corresponding invoice field.

FIG. 10 is an example of an invoice processor 1000 according to one embodiment of the present invention. Invoice processor 1000 consumes invoices from invoice repository 1050. Invoice processor 1000 retrieves invoices from the repository and executes verification rules. Invoice processor 1000 then creates exceptions if verification is unsuccessful, or posts the invoice if the verification is successful. Invoice processor 1000 may use the context builder to retrieve context information associated with the invoice to facilitate the verification process. During verification, invoice processor 1000 executes a set of verification rules. In one embodiment, the verification rules may be specified by a user (e.g., a company employee responsible for invoice processing rather than a programmer), including reconfiguring rules, activating or deactivating rules or specifying additional rules as desired. Invoice processor 1000 then determines the proper routing of the invoice based on the results of the verification. For example, if the verification is successful, invoice processor 1000 may route the invoice to a backend posting system 1060 automatically. If one or more of the verification rules is not met, invoice processor 1000 may create an exception and route the invoice according to exception work flow rules. In one embodiment, the exception work flow rules and/or exception handling procedures may also be specified by a user.

In one embodiment, invoice processor 1000 includes a process manager 1010 and verification component 1020 (sometimes referred to as an "exception inspector"). Process manager 1010 allows users to specify verification rules and exception work flow rules and handling procedures, retrieves invoices from invoice repository 1050 and controls the routing in accordance with the specified rules and procedures. Verification component 1020 executes the rules on each invoice as they are retrieved from the repository 1050. Verification component 1020 may provide a list of checks applicable to an incoming invoice and the order of execution, and apply the checks to each invoice. Details of verification failures may be returned and stored for further analysis or use. Verification component 1020 allows for configuring each check as specified by a user, and may support activation or deactivation of each check as desired by a user. In one embodiment, all exceptions occur before the data in a backend system is changed by the invoice posting so that roll-back is not an issue until the invoice gets posted. Embodiments of the present invention may include some or all of at least the following verification checks:

Template Check

Invoice data is compared to a template that has been setup by the party receiving the invoice.

Example: If the template has been defined such that the PO number field is required and vendor must be "SAP," and the system receives an invoice with PO Number blank and vendor "SAP," then this check fails.

Missing Data Check

The invoice and its context are checked to see if it contains all mandatory information. If invoice date, invoice amount and vendor name have been specified in the verification rules as mandatory, then if any one of these fields is blank, this check fails.

Invalid Data Check

The information provided in the invoice does not conform to standards or does not exist in the system (e.g., a unit of measure should confirm to a standard, date is not in the correct format, a tax distribution is not as specified by the company, the vendor is new and does not exist in the system, PO number does not exist in company's system, the requisitioner is not an employee of the buying organization, Duplicate Invoice Check The incoming invoice and its context are compared with existing invoices. The criteria for what fields are compared and whether an exact match or a fuzzy match is used may be configurable.

Non-PO Invoice Check

If the incoming invoice has no PO then the system may initiate a predefined "approval" workflow, which may route the invoice to the cost center manager, for example.

Line Item Mismatch Check

The system cannot match the PO Line Item to the Invoice Line Item (e.g., the descriptions on line items of the invoice and the PO do not match).

Price Variance Check

Detects differences in pricing between expected prices specified in a PO and the actual price indicated in the invoice received from the supplier. Example cases include: item price has changed, negotiated discounted price was not applied, freight charges are not specified in PO but appear in invoice, incorrect tax applied, etc. Price comparisons may be done at the item level as well as total gross amount. Prices may be compared using a configurable tolerance factor specified as a percentage or absolute value rather than for exact equality (e.g., price in invoice must be within 2% of price in PO, or within $1 of expected price).

Quantity Variance Check

Quantity variance can occur when the invoice comes in before the goods are shipped, when the good are received but the GR clerk hasn't yet entered then into the system or when the goods are received but the quantity received does not match invoice quantity.

FIG. 11 is an example of an exception manager according to one embodiment of the present invention. The exception manager component provides the ability to act on exceptions detected on incoming invoices by the invoice processor. Invoice processor 1150 is coupled to exception store 1110 (e.g., an exception repository such as a database). Exception store 1110 stores information corresponding to exceptions. When verification of an invoice is unsuccessful, the invoice may be forwarded to exception store 1110. In one embodiment, exceptions may be captured as cases stored in exception store 1110, and actions taken to resolve an exception may be recorded under each case. An example specification for one possible implementation of an exception store is provided below. Exception manager 1120 provides tools for supporting exception resolution. In one embodiment, exception manager 1120 controls the work flow for resolving exceptions. One advantage of the present invention is that exception handling procedures controlled by exception manager 1120 may be customized by a user. Thus, a user may specify the procedures for resolving an exception. Such procedures may include specifying the individuals involved in resolving the exception, specifying routing procedures, specifying roles, specifying what data is to be retrieved, specifying how the data is to be retrieved, specifying alerts, specifying timeouts, specifying elevation criteria, specifying invoice approval criteria or rejection criteria, specifying rejection protocols or specifying fraud detection and prosecution protocols.

As mentioned above, in some embodiments the exception manager may be role based (i.e., exception manager determines at least some of the users involved in a exception handling procedure). Moreover, in some embodiments the exception manager may determine how particular users are contacted (e.g., email, etc. . . . ), when particular users are contacted (i.e., according to exception handling rules) and what information such users receive. Thus, embodiments of the present invention may include storing role information (e.g., exception handlers job information), communication information, exception routing rules or data filtering rules to facilitate more efficient exception handling.

In one embodiment, exception manager 1120 provides an "Inbox" user interface. The Inbox and the data retrieved and displayed in the Inbox may be automatically modified based on different user roles. A user may select one invoice from a list and drill-down to see the invoice data and particular exception for the invoice of interest (e.g., header and line item information). Context information such as purchase order, vendor, related invoices, goods receipt, contacts, attachments and case history are accessible either directly in the exception store or through a reference to another repository. Exception manager 1120 may be coupled to an index database (not shown) to allow a user to search through invoices or to manually search for additional information about an invoice. Exception manager 1120 may also provide filtering for inbox management. For example, a user may apply a filter to reduce the number of invoices shown in the Inbox and focus on specified subsets of exception cases. Exception manager 1120 may also support posting, deleting, editing and forwarding of invoices as required for exception handling, or the ability to email or chat with contacts concerning particular exception cases. Exception manager 1120 may further track the history of an invoice so different participants can gain a full understanding of the history of each case. In one embodiment, after an invoice is processed by the exception manager and the exception resolved, the invoice processor performs the verification on the invoice again. Dispute management component 1130 may be integrated into exception manager 1120 or operate as a stand alone component providing work flows and data access for resolving disputed invoices.

The following are example procedures for resolving exceptions corresponding to the above-mentioned verification checks.

Template Exception Handler

If a template check fails then the system may highlight the fields that made the template check fail and allow the user to correct the invoice or forward the invoice to another contact for resolution.

Missing Data Handler

If the requisitioner information is available then the invoice is routed to the requisitioner through an email form. The requisitioner can then attempt to fill up the data or send it back to the vendor or any other contact who might have this information. The system may search the context information and provide suggestions to the user.

Invalid Data Handler

When the invoice does not adhere to standard formats, the invoices are sent back to the vendors for correction.

When the vendor does not exist in the system, a work item is sent to the purchasing officers Inbox. He can then open the item, look at the invoice and its context, create the vendor and resolve the open item.

When the PO number specified in the invoice does not exist in the system, an interactive form is sent to the requisitioner via email, he can then correct the PO number or forward the exception to the vendor for resolution.

When errors like date mismatch, tax distribution problems or requisitioner not found occur, the vendor is directly notified of the problem through an interactive form.

Duplicate Invoice Handler

The original invoice and the duplicate invoice are displayed side by side to a user such as an AP clerk. He can then decide to reject or accept the new invoice. If he rejects the invoice an email is sent to the vendor with the complete context of the two invoices and their scanned images. The vendor can dispute this duplicate if needed.

Non PO Authorization Handler

The cost center of the requisitioner is checked and the invoices forwarded to his manager for approval. The invoice is sent through email as an interactive form and authorization is through a digital signature.

Line Item Mismatch Handler

The invoice line items and the PO line items are displayed side by side, and a user such as an AP clerk can select the appropriate line item in the invoice that matches the PO. If he cannot make this decision then he can forward this exception to the requisitioner for resolution.

Price Variance Handler

If the price on the PO is incorrect, a user such as an AP Clerk may change the PO pricing. If the price variance is above the limit then approval by an AP Manager may be needed before accepting Invoice. Limits may be configurable. If pricing in an invoice is not correct then allow the system to send the invoice back to the vendor.

Quantity Variance Handler

If the invoice comes in before the goods are received, the exception handler does not process this invoice for a certain number of days. The number of days the system will "WAIT" may be configurable. Once this time frame has passed, and if the good still haven't been received, a work item is sent to the GR clerk for verification. The GR clerk can then forward this exception to the vendor for resolution. If the goods have come in, the GR clerk can confirm his work item as received. If the quantity received doesn't match the invoice quantity then the AP clerk is given the option of short payment, in which case he can pay for the goods already received and notify the vendor of the same.

Example User Interfaces and Work Flows

FIG. 12 is an example process flow for resolving an exception according to one embodiment of the present invention. The present example illustrates the handling of a duplicate invoice. A duplicate exception will typically occur when an invoice is received by a company from a vendor and entered into the invoice management system, and then another invoice is received with the same or substantially the same information (e.g., the same vendor bills twice for the same goods or services). In one embodiment, invoice data and context information for each invoice may be automatically compared against existing invoices to detect a duplicate (e.g., in an invoice processor during a verification as described above). Embodiments of the present invention allow a user to configure the matching criteria used to detect duplicates. For example, a user may specify the particular portions (e.g., fields) of invoice data or context to be compared. A user may further specify whether exact matching is required or whether non-exact matching (e.g., "fuzzy") matching is to be used to detect duplicates.

At 1201A, a user ("U1") employed by a vendor mails or faxes a paper invoice to the company buying the vendor's goods or services. At 1202, the company receives the invoice, and another user ("U2") may enter the invoice data into the system using an invoice entry software component. Alternatively, invoice data in electronic form at 1201B can be transmitted automatically to an invoice management system. At 1203, the invoice data is processed by the invoice management system. At 1204, the system detects a possible duplicate and sends a notice to U2 or another user ("U3") employed by the company (e.g., in a different department) along with the invoice data, information from the context builder and suggested actions. For example, the notice may appear in an "Inbox" as described in more detail below. U2 may review the information and determine that it is in fact a duplicate. U2 may then quickly mark the duplicate for deletion and automatically transmit an electronic notification to U1. The electronic notification may include some or all of the invoice data, invoice context information and an electronic form. At 1206, the electronic notification is received by U1 (e.g., in an "Inbox"). When U1 receives the notification, the information can be reviewed quickly and the duplicate can be confirmed or disputed quickly as shown at 1207. If the duplicate is confirmed at 1209, it may be routed to invoice management system at 1210 and automatically deleted with no further user interaction. If U1 disputes that the invoice is a duplicate, a dispute signal may be sent to U2 for further processing.

FIG. 13A is an example of a graphical user interface ("GUI") 1300A for managing invoice exceptions according to one embodiment of the present invention. The present example illustrates a GUI that may be used for managing duplicate invoices, invoices with missing information or line item mismatches. A variety of information stored in an invoice management system may be retrieved and presented to a user for efficient management of invoices. For example, a portion of GUI 1300 labeled "You are here" 1301 is used to display status categories and summary information (i.e., the number of invoices in a category) for invoices in the system. Such information may include the number of invoices in an accounts payable inbox ("A/P Inbox") 1302, the number of blocked invoices 1303, the number of invoices forwarded to a vendor 1304, the number of invoices in dispute 1305, the number of invoices cleared for payment 1306 and the number of deleted invoices 1307.

Exceptions may be presented to a user in the form an "inbox" (i.e., an exception inbox) 1310. Exception inbox 1310 may include one or more rows each corresponding to an exception such as "Duplicate" 1311 indicating the existence of a potentially duplicative invoice, "Missing Information" 1312 indicating that an invoice has been received without certain information, and "Line Item Mismatch" 1313 indicating that one or more line items on the invoice (i.e., information about individual items purchased from the vendor) do not match up with line items in the invoice management system (e.g., information about individual items requested in a purchase order). The exceptions may be color coded so that each exception is displayed in a different color. A user may access and process an exception by selecting one of the exception row entries (e.g., by double-clicking on a row entry with a mouse).

Invoice data and context information may be displayed as fields (i.e., columns) for each exception in an Inbox. For example, the first field 1314 may indicate the type of exception. Invoice data displayed with each exception may include the "source" of the invoice 1315 (e.g., Paper/OCR, Fax/OCR, EDI, XML), "invoice number" 1316, "invoice date" 1317, invoice "amount" 1318, "vendor" 1319 and a "description" 1320, for example. Other invoice data or context information may also be displayed. Inbox 1310 may include a display of summary information 1321 including the total number of invoices in the "inbox," and the number of each type of exception. Inbox 1310 may allow a user to enter a new invoice (e.g., using electronic button 1322), post invoices 1323 or delete invoices 1324.

FIG. 13B is an example of a graphical user interface ("GUI") 1300B for managing duplicate invoice exceptions according to one embodiment of the present invention. In response to selecting a duplicate exception in GUI 1300A, the invoice management system retrieves invoice data corresponding to both an original invoice and the duplicate (i.e., the new invoice). The invoice data may be displayed together in a single GUI 1300B. In one embodiment, the original invoice data 1325B and the duplicate invoice data 1325A are displayed side by side at 1326A and 1326B. The data may be also displayed side by side in "invoice format" (i.e., displaying the invoice data using the same visual format as a paper invoice, wherein invoice data is divided into a plurality of groups and one group is displayed as entries and at least one other group is displayed in tabular form in a different portion of the display). Furthermore, the system may compare each invoice data field in invoice 1325A to the corresponding field in invoice 1325B. If the fields do not match, the system may flag those fields and highlight non-matching fields in the display, for example.

For example, both the original invoice 1325B and the new invoice 1325A are displayed side by side at 1326A and 1326B for easy comparison. Invoice displays 1326A and 1326B may include icons 1399A and 1399B indicating the source of the invoice. For example, icon 1399A may display a graphic indicating that the source of the invoice was a facsimile (i.e., "FAX"). Similarly, icon 1399B may display a graphic indicating that the source of the invoice was electronic (e.g., an image of a computer). Additionally, invoice displays 1326A and 1326B may include the following invoice data grouped and displayed as entries in the upper portions 1327A and 1327B: invoice number, an accounting document number ("Acc. document"), purchase order number ("PO"), the name of the "Requisitioner," invoice data, posting date, vendor identification, customer name, customer address, customer phone number, customer fax, and the user's email. The following invoice data is grouped and displayed side by side in tables 1328A and 1328B: "Description," quantity or hours ordered, quantity or hours received, price or rate, and total for a plurality of line items. The following invoice data is grouped and displayed side by side: payment mailing information 1329A and 1329B (e.g., the name, address, city, state, zip code, phone number and fax number of the vendor), the terms of payment 1330A and 1330B (e.g., "Net 30"), and tables 1331A and 1331B including subtotal, tax (if any), shipping costs, miscellaneous expenses and balance due.

GUI 1300B further includes features for retrieving and displaying other important information useful for streamlining the management and processing of invoices. For example, invoice management system may retrieve and display detailed invoice information, detailed line item information or an image of an invoice if a user selects "Detailed Invoice" 1333A, "Detailed Line Items" 1333B or "Scanned Invoice" 1333C, respectively. In one embodiment, a user may also retrieve and display scanned invoices by selecting link 1332A ("Compare Scanned Invoices"). FIG. 13C illustrates scanned images of both the original invoice and the new invoice displayed side by side for comparison. If images are available, GUI 1300C will replace the invoice data displayed in invoice format at 1326A-B with the images as shown at 1326A and 1326B in FIG. 13C. Easy one-click access to and comparison of the scanned invoices reduces the time required for analyzing and resolving duplicates. A user may return to GUI 1300B by selecting link 1332B, which may display "Compare Invoices" for example.

A user may access yet more information about an invoice by selecting "Detailed Invoice" view (e.g., by accessing link 1333A in FIG. 13B). In response to a user selecting "Detailed Invoice," the system retrieves and displays additional invoice data and context information. FIG. 13D is an example of a graphical user interface ("GUI") 1300D that displays a detailed invoice view according to one embodiment of the present invention. Detailed invoice view 1333A (FIG. 13D) may include all the information accessed and displayed in 1326A or 1326B (FIG. 13B) and further include documents relating to the invoice 1334 ("Other Documents"), an invoice log 1335 ("Invoice Log"), contact information and communication capabilities 1336 ("Contacts") and notes associated with the invoice 1337 ("Notes").

Invoice log 1335 may be used to track the event history of the invoice. For example, invoice log 1335 may include the date, event and name of the person involved in the event. This information is displayed at 1335A. Furthermore, "Other Documents" 1334 may include accessing a variety of documents relating to the invoice, such as a materials description 1334A, a work description 1334B or other related documents such as a contract pertaining to the invoice, for example. Since a variety of users may access the invoice during processing, different users may attach different relevant documents so that relevant documentation pertaining to the invoice is readily available for access and review through GUI 1300D. Documents may be attached by typing in the name of the document at 1334C or browsing the network and selecting particular files using the "Browse" feature 1334D.

Different users may attach notes to the invoice by typing text into field 1337A. The text may be posted by selecting "post it" 1337B, for example. A list of notes may be displayed at 1337C along with the date the note was posted ("Date"), the text ("Notes") and an identification of the user who entered the note ("Entered By").

In one embodiment, an invoice management system includes an integrated communication system that allows different users to correspond about invoice issues. For example, a user may correspond with contacts automatically using "Contacts" 1336. Additionally, a user may enter contact information corresponding to each invoice. For example, at 1336A, a user may enter a contact's name or email or both. The contact is added to the system by selecting "Add Contacts" 1336B. The contacts associated with the invoice are listed at 1336C along with "Role" and name (i.e., "Contact") fields. Roles may include vendor or company groups such as requisitioner, cost center manager, A/R manager, A/P manager or A/P clerk, for example. A user may correspond with a contact by creating a new email message, chat session or other electronic communication.

Referring again to FIG. 13B, when a user has completed the review of a duplicate, the user may either reject the alleged duplicate invoice by selecting "Reject Invoice" 1340, allow the alleged duplicate to be posted by selecting "Post" 1341 or by selecting "Park" 1342 (i.e., sending the invoice to a financial application as a "parked" invoice). In one embodiment, when a user rejects an invoice the IMS system automatically generates a notification and transmits the notification to the vendor. Additionally, a user may include a note to the vendor with the notification by entering text at 1343.

FIG. 13E illustrates an example notification 1300E received by a vendor. GUI 1300E includes an original invoice 1325A with invoice data displayed at 1326A. GUI 1300E also includes a potentially duplicative invoice 1325B with corresponding invoice data displayed at 1326B, which may be displayed side by side with the original invoice data as shown. GUI 1300E may further include a text message 1372, which may include automatically generated text and/or user specified text entered as a note to the vendor at 1343 of FIG. 13B, for example. The vendor may also be provided with the ability to automatically confirm or dispute the duplicate. For example, the notification may include an integrated response, such as "confirm" or "dispute." In one embodiment, the notification is in the form of an email and GUI 1300E is displayed by an email system. The email system may receive an IMS Alert regarding the invoice with a subject line "IMS Alert: Duplicate Invoice," for example. When a user opens the IMS Alert, invoice data and a text message may be displayed, and a confirmation response selector 1374 and dispute response selector 1375 may be presented to a user. Response selection may be implemented using electronic buttons, menu items, links or equivalent techniques. A user may confirm that invoice 1325A is a duplicate by selecting "Delete Invoice" 1375. A response is automatically sent to the invoice management system, and the invoice is deleted. Alternatively, a user may dispute that invoice 1325A is a duplicate by selecting "Reject Duplicate" 1374. In this case, a response will be automatically sent to the Inbox of a user at the company for further processing and resolution. In one embodiment, notification 1300E includes images of the original invoice 1325B and the alleged duplicate 1325B. FIG. 13F illustrates an example email notification 1300E received by a vendor including an image of the original invoice displayed at 1326B and an image of the alleged duplicate displayed at 1326A.

FIG. 14 is another example process flow for resolving an exception according to another embodiment of the present invention. The present example illustrates the handling of an invoice with missing or invalid information (together, "missing information"). At 1401A, a user ("U1") employed by a vendor mails or faxes a paper invoice to the company buying the vendor's goods or services. At 1402, the company receives the invoice, and another user ("U2") may enter the invoice data into the system using an invoice entry software component. Alternatively, invoice data in electronic form at 1401B can be transmitted automatically to an invoice management system. At 1403, the invoice data is processed by the invoice management system. In one embodiment, invoice data is automatically populated when additional information about the invoice is retrieved (e.g., by the context builder) in order to reduce data entry. At 1404, the system detects missing information and automatically sends an electronic notification to U1 notifying U1 that the received invoice is missing data. The electronic notification may include some or all of the invoice data, invoice context information and an electronic form. At 1405, the electronic notification is received in an inbox, such as an email inbox, for example. U1 updates the invoice data in the electronic notification at 1406. In one embodiment, the system sends U1 an electronic form that U1 can complete or fill in online (e.g., an Adobe® form) and return to the system automatically. At 1407, the updated invoice data is returned to the system and reanalyzed automatically. If information is still missing, the invoice may be rerouted through the process. If the data is complete, the invoice may be posted automatically at 1408.

In other embodiments, an invoice management system may send notifications to different users within the company to resolve the exception. For example, in one embodiment, the invoice management system may send a notification to a requisitioner if requisition information is available. The requisitioner may receive an electronic form, for example, and update the invoice data and return the updated information to the system automatically. The requisitioner may forward the notification to the vendor or other users in the company (e.g., in other departments). In one embodiment, if vendor information is not available, an exception is set to a user in the company (e.g., a purchasing officer). The user may examine the invoice data and context, assign a vendor and resolve the exception, or forward the notification to another user more likely to have the required information. In another embodiment, when a purchase order specified in the invoice does not exist in the invoice management system, an interactive form may be sent to the requisitioner as a notification (e.g., email). The requisitioner may then correct the purchase order number or forward the exception to the vendor for resolution. Thus, the flexibility of the integrated data and communication techniques of the invoice management system described herein may be used to resolve many different types of invoice exceptions efficiently through streamlined interaction with relevant information holders.

In one embodiment, when a missing information notification is sent to a vendor, an exception is created and a "Missing Information" exception 1312 appears in an exception inbox as shown in FIG. 13. In response to a user selecting "Missing Information" exception 1312, the system retrieves and presents the invoice data for the selected exception in GUI 1500A of FIG. 15. GUI 1500A may include a message 1501 indicating that the posting failed and the system automatically generated a notification to the vendor. Additionally, invoice data may be displayed, and missing invoice data fields (e.g., purchase order number 1510 and requisitioner 1511) may be highlighted.

FIG. 15B illustrates a notification according to one embodiment of the present invention. The notification may be presented to a user in GUI 1500B. GUI 1500B includes invoice data 1501 and message 1502. Invoice data may be presented as a fillable document (i.e., an electronic form that may fields for receiving and storing input data or text) In the present example, the missing invoice data fields are purchase order number ("PO") and requisitioner. A Tillable form may include one or more fields for receiving the missing invoice data from a user-vendor. If the user desires more information about the invoice, the user may select link 1504, which may retrieve and present additional information about the invoice including images, for example. The vendor may also be provided with the ability to automatically return the updated invoice information to the invoice management system. For example, the notification may include an integrated response, such as "Send Updated Invoice." Response selection may be implemented using electronic buttons, menu items, links or equivalent techniques. In one embodiment, the notification is in the form of an email and GUI 1500B is displayed by an email system. The email system may receive an IMS email notification regarding the invoice with a subject line including "IMS invoice: important information missing," for example.

FIG. 16 is another example process flow for resolving an exception according to another embodiment of the present invention. The present example illustrates the handling of an invoice requiring approval before the invoice can be posted. For example, if an invoice has not associated purchase order, payment may require that one or more employees of a company approve the invoice. The present invention streamlines this process, which can be very slow and time consuming when implemented in paper based or non-integrated systems. As previously mentioned, invoice data may be received electronically or in paper form and processed by the invoice management system at 1601A-B and 1603. In one embodiment, invoice data is automatically populated when additional information about the invoice is retrieved (e.g., by the context builder). Autopopulated data may include account information and the person with approval authority, such as a cost center manager, for example. At 1604, the system may determine that approval is required (e.g., no purchase order). When an approval is required the system automatically sends an electronic notification to a company employee for approval at 1605. The system may also create an exception, which may appear in the Inbox of a user in another department (e.g., accounts payable) for tracking the status of the invoice. The electronic notification may include some or all of the invoice data, invoice context information and an electronic form. Additionally, the system may store information indicating that the invoice is blocked until approval is obtained. At 1606, the invoice is approved or rejected. If the invoice is rejected, the invoice data is updated to indicate the rejection. The invoice may then be automatically routed to another user at 1607 to resolve the exception with the vendor. The vendor may also automatically receive a notification of the rejection at 1608. If the invoice is approved at 1606, the invoice is automatically posted at 1609.

FIG. 17A is an example of a graphical user interface 1700A for managing invoices according to another embodiment of the present invention. Invoices may be "blocked" from payment and displayed to a user in response to selection of "Blocked Invoices" 1701. Blocked invoices may include invoices that require approval 1710, invoices where no corresponding goods were ever received by the company (i.e., "Missing G/R") 1711 or invoices where no services were ever received by the company (i.e., missing service entry, "Missing S/E") 1712. Invoice data that may be retrieved by the system and presented to a user may include the exception causing the block at column 1721 (e.g., approval, missing G/R, missing S/E), the number of days the invoice has been blocked at 1722, the current owner (e.g., the person who's approval is required or who is researching the missing goods or services) at 1723, the invoice number at 1724, the payment date at 1725, the amount due at 1727, vendor information at 1728 and a description at 1729.

A user may mouse click one of the blocked invoices to obtain a more detailed view. For example, the invoice at 1710 has been blocked waiting for approval for 37 days. A user may mouse click the "Approval" invoice 1710 to obtain more information about the exception. FIG. 17B is an example of a detailed view of the blocked invoice that may be presented to a user in GUI 1700B. The following examples of invoice data may be retrieved by invoice management system and presented: invoice number, account document ("Acc. document"), purchase order, requisitioner, invoice date, posting date, vendor ID, customer name, customer address, customer phone number, customer fax number, customer email and line item data including line item number, block description (e.g., the invoice is blocked because it needs approval), line item description, quantity of goods or services invoiced, quantity of goods or services approved, quantity unit of measure, rate (i.e., price per unit) and line item total. The system may further retrieve and display the name of the person responsible for the approval. A user may review the detailed invoice data and decide to send a reminder notification to person responsible for the approval by selecting reminder option 1730. A user may include a note with the reminder by entering text into text field 1731. The original approval notification generated by the IMS system and/or the reminder notification may include an electronic approval wherein the person responsible may approve the invoice electronically by a mouse click or by entering text.

In one embodiment, the notification is an email including invoice data and an electronic signature (i.e., a digital signature). For example, FIG. 17C is an example of an Adobe® form that may be included with an approval notification. Adobe® form 1700C displays the invoice data in invoice format for easy review, and further provides an electronic signature input 1750. A user may approve the invoice by entering an electronic signature in field 1751 and mouse clicking "Submit Invoice" 1752, for example.

FIG. 18 is an example process flow for resolving a line item mismatch exception according to another embodiment of the present invention. A line item mismatch may occur when the invoice line item field does not match a purchase order line item field. For example, if an invoice line item description field does not match a purchase order line item description field during IMS processing at 1803, a line item mismatch may occur at 1804. At 1805A, IMS sends a line item mismatch notification to a user ("U1") within the company, such as a user in accounts payable, and may send a notification to a user ("U2") at the vendor at 1805B. If U1 or U2 can resolve the problem electronically at 1806 (e.g., if the vendor determines that the description is erroneous or if U1 can fix the problem by matching PO line items to invoice line items), then the invoice is automatically sent back to the IMS for further processing at 1809 and automatically posted at 1810. If the problem cannot be resolved, a notification is sent to another user ("U3") at 1807 who has more information about the invoice and it's line item descriptions (e.g., the requisitioner). The invoice is resolved at 1808 and returned to the IMS for further processing.

FIG. 19 is an example process flow for resolving missing goods received or services received (i.e., "Missing G/R" or "Missing S/E") exceptions according to another embodiment of the present invention. The invoice is received at 1901 and processed at 1902. A missing goods received or missing services received exception is detected by the invoice management system at 1903. In one embodiment, when IMS detects a Missing G/R, it may automatically wait for a specified amount of time at 1904 (e.g., in case the invoice is received before the goods or services are provided). If the goods or services are received and entered at 1905 into the system within the specified time period, the IMS continues processing the invoice at 1911 and automatically posts the invoice at 1912 without human intervention. If the goods or services are not provided and entered into the system within the specified time period, the system will send a notification to a user ("U1") (e.g., in the receiving department) at 1906. The IMS may again automatically wait for another specified amount of time at 1907. If the goods or services are received and entered at 1908, IMS processing may continue. If the goods or services are not received with the second time period, the system may escalate by sending a notification to another user ("U2"), such as a requisitioner at 1909. U2 may then directly resolve the issue at 1910 by corresponding with the vendor or through other electronic or non-electronic means and release the invoice for further processing.

Example Specification for an Exception Store

The following specification is one possible implementation of an exception pool that may be used in an invoice management system. While the following example illustrates a table-based implementation, it is to be understood that other implementations may be used. For example, the exception repository could be implemented as objects that are associated with an invoice or invoice object. The following Tables are examples of TABLE TYPE DEFINITIONS:

A) Domain

TABLE 1

Name IMS_EXCEPTION_TYPE   Type CHAR   Length 1
Description Type of IMS exception
Permitted Values and Corresponding Meaning
D   Duplicate
M   Missing or Invalid Info
A   Non-PO Approval Required
L   Line Item Mismatch
G   No Goods Receipt
Q   Quantity Variance
P   Price Variance
T   Technical Error

TABLE 2

Name IMS_EXCEPTION_STATUS   Type CHAR   Length 1
Description Status of IMS exception
Permitted Values and Corresponding Meaning
1   New
2   Blocked Internally
3   Forwarded to Vendor
4   In Dispute
5   Cleared for Payment
6   Rejected
7   Deleted

TABLE 3

Name IMS_EXCEPTION_REFERENCE_TYPE   Type CHAR   Length 1
Description Type of IMS exception reference
Permitted Values and Corresponding Meaning
1   MS Office Document
2   Invoice
3   Purchase Order
4   Vendor
5   Other B) Data Element

TABLE 4

Name IMS_EXCEPTION_TYPE   Domain IMS_EXCEPTION_TYPE
Description Type of IMS exception

TABLE 5

Name IMS_EXCEPTION_STATUS   Domain IMS_EXCEPTION_STATUS
Description Status of IMS exception

TABLE 6

Name IMS_EXCEPTION_CASE_ID   Domain CHAR10
Description IMS Exception Case ID

TABLE 7

Name IMS_EXCEPTION_INBOX_ID   Domain CHAR10
Description IMS Exception Inbox ID

TABLE 8

Name IMS_EXCEPTION_CONTACT_ID   Domain CHAR10
Description IMS Exception Contact ID

TABLE 9

Name IMS_DATETIME   Domain CHAR14
Description Date and time used in IMS exception processing

TABLE 10

Name IMS_EXCEPTION_REFERENCE_NAME   Domain CHAR20
Description Name of IMS exception reference

TABLE 11

| Name | Domain |
|---|---|
| IMS_EXCEPTION_REFERENCE_TYPE | IMS_EXCEPTION_REFERENCE_TYPE |
| Description Type of IMS exception reference | |

TABLE 12

| Name IMS_EXCEPTION_REFERENCE_FIELD | Domain CHAR10 |
|---|---|
| Description Field of IMS exception reference | |

TABLE 13

| Name | Domain CHAR255 |
|---|---|
| IMS_EXCEPTION_REFERENCE_VALUE | |
| Description Value of IMS exception reference | |

C) Structure

TABLE 14

| Name | BBPS_INVOICE_EXCEPTION | |
|---|---|---|
| Components | | |
| Name | Data Type | Description |
| INVOICE_ID | IMS_GUID | ID of the invoice that caused this exception. |
| TYPE | IMS_EXCEPTION_TYPE | Type of this exception |
| CASE_ID | IMS_CASE_ID | ID of the case management solution that contains an entry if logged in as a case. Most common exceptions are logged as cases. |
| INBOX_ID | IMS_INBOX_ID | ID of the inbox that this exception is assigned to. |
| STATUS | IMS_EXCEPTION_STATUS | Status of this exception. |
| CONTACT_ID | IMS_CONTACT_ID | ID of the contact currently working on this exception. |
| LAST_ACTION_DATE | IMS_DATETIME | Date and time of last action on this exception |
| CREATION_DATE | IMS_DATETIME | Date and time when this exception was created. |

TABLE 15

| Name | BBPS_EXCEPTION_REFERENCE | |
|---|---|---|
| Components | | |
| Name | Data Type | Description |
| NAME | IMS_EXCEPTION_REFERENCE_NAME | Name is unique for an invoice. |
| EXCEPTION_ID | IMS_GUID | ID of the exception this record refers to. |
| EXCEPTION_TYPE | IMS_EXCEPTION_TYPE | ID of the exception that is related to this reference |
| INVOICE_ID | IMS_GUID | ID of the invoice |
| TYPE | IMS_EXCEPTION_REFERENCE_TYPE | Reference type |
| FIELD | IMS_EXCEPTION_REFERENCE_FIELD | Name of the field that is referenced, blank if this is not referring to a business object |
| VALUE | IMS_EXCEPTION_REFERENCE_VALUE | Value of this field, which may contain a URL for certain types such as MS Office. |

TABLE 16

| Name | BBPS_INVOICE_EXCEPTION_UI | |
|---|---|---|
| Components | | |
| Name | Data Type | Description |
| ID | IMS_GUID | Auto generated ID that uniquely identifies the exception. |
| .INCLUDE REFERENCES | BBPS_INVOICE_EXCEPTION BBPT_IMS_EXCEPTION_REFERENCE | References related to this exception. |

D) Table Type

TABLE 17

| Name | Line Type |
|---|---|
| BBPT_IMS_EXCEPTION_REFERENCE | BBPS_EXCEPTION_REFERENCE |

TABLE 18

| Name | Line Type |
|---|---|
| BBPT_IMS_INVOICE_EXCEPTION_UI | BBPS_INVOICE_EXCEPTION_UI |

The following Tables are examples of TABLE DEFINITIONS. The exception pool may include a table BBPD_IMS_EXPPOOL, which is the exception pool that contains exceptions related to invoices. This table may be used as the core table for exception processing. There may also be other tables that contain useful information. Table BBPD_IMS_EXPPOOL has the following structure:

TABLE 19

(1) Column(s) of "BBPD_IMS_EXPPOOL" Table

| Name | Datatype | Null Option | Comment |
|---|---|---|---|
| MANDT | MANDT | NOT NULL | Client Specific |
| ID | IMS_GUID | NOT NULL | Auto generated ID that uniquely identifies the exception |
| .INCLUDE | BBPS_IMS_INVOICE_EXCEPTION | | |

(2) Primary Key Column(s) of "BBPD_IMS_EXPPOOL" Table

| Name | Comments |
|---|---|
| MANDT | |
| ID | |

(3) Index(s) of "BBPD_IMS_EXPPOOL" Table

| Name | Unique |
|---|---|
| ID | Yes |
| INVOICE_ID | No |
| TYPE | No |
| INBOX_ID | No |
| STATUS | No |

The exception pool may include a Lock Object table E_IMS_EXC, which is lock object for synchronization of the exception pool.

TABLE 20

Name E_IMS_EXC
Description Lock object for synchronization of exception pool.
Primary Table BBPD_IMS_EXPPOOL
Lock Parameters

| Name | Table | Field |
|---|---|---|
| MANDT | BBPD_IMS_EXPPOOL | MANDT |
| ID | BBPD_IMS_EXPPOOL | ID |

The exception pool may include a Table BBPD_IMS_EXPREF, which is a reference to another item such as a PO, Invoice or context. These items could either reside in a reference pool or the invoice pool. There may be multiple reference items for an exception.

TABLE 21

| Column(s) of "BBPD_IMS_EXPREF" Table | | | |
|---|---|---|---|
| Name | Datatype | Null Option | Comment |
| MANDT | MANDT | NOT NULL | Client Specific |
| ID | IMS_GUID | NOT NULL | Internal Reference ID that uniquely identifies a reference to an exception. |
| .INCLUDE | BPPS_IMS_EXCEPTION_REFERENCE | | |

| Primary Key Column(s) of "BBPD_IMS_EXPREF" Table | |
|---|---|
| Name | Comment |
| ID | |

| Foreign Key Column(s) of "IMS_EXP_REF" Table | | |
|---|---|---|
| Name | Check Table | Check Field |
| EXCEPTION_ID | BBPD_IMS_EXPPOOL | ID |

| Index(s) of "IMS_EXP_REF" Table | |
|---|---|
| Name | Unique |
| ID | Yes |
| INV_ID | No |
| NAME | No |
| TYPE | No |

The exception pool may include a plurality of Agent Application Program Interfaces ("APIs") that allow external access for retrieving exceptions, searching exceptions, modifying exceptions or adding exceptions. For example, a user may retrieve an exception according to the input exception ID. References related to the exception will also be retrieved. A warning embedded in an export parameter E_RET may indicate that the exception with the specified ID does not exist.

TABLE 22

Input Parameter(s)
Name IV_EXCEPTION_ID    Data Type IMS_GUID
Output Parameter(s)

| Name | Data Type |
|---|---|
| ES_INVOICE_EXCEPTION_UI | BBPS_IMS_INVOICE_EXCEPTION_UI |
| EV_RETURN | BAPIRETURN |

Related table(s)
BBPD_IMS_EXPPOOL, BBPD_IMS_EXPREF

The exception pool may include an Agent API that searches for exceptions with specified field values. References related to these exceptions are also retrieved. A user inputs an IS_INVOICE_EXCEPTION_UI structure, whose fields specify the searching criteria. An empty field implies that there're no requirements for this field. If no records satisfy those criteria an empty export parameter ET_INVOICE_EXCEPTION would be returned.

TABLE 23

| Input Parameter(s) Name | Data Type |
| --- | --- |
| IS_INVOICE_EXCEPTION_UI | BBPS_IMS_INVOICE_EXCEPTION_UI |

| Output Parameter(s) Name | Data Type |
| --- | --- |
| ET_INVOICE_EXCEPTION_UI | BBPT_IMS_INVOICE_EXCEPTION_UI |
| ES_RETURN | BAPIRETURN |

| Related table(s) |
| --- |
| BBPD_IMS_EXPPOOL, BBPD_IMS_EXPREF |

The exception pool may include an Agent API that modifies the exception specified by the input parameter IS_INVOICE_EXCEPTION_UI's ID field. If the input parameter's fields are empty, such fields would not influence the exception pool. All the references related to the specified exception will be deleted first, and new references will be created according to the REFERENCES field of the input parameter. Redundant fields in the reference pool may be set with the values contained in IS_INVOICE_EXCEPTION_UI itself, rather than the attached REFERENCES. This measure may be used to keep the consistency between the BBPD_IMS_EXPPOOL and BBPD_IMS_EXPREF database tables. One cannot make a reference's fields different from its related exception with BBP_IV_IMS_MODIFY_EXCEPTION.

TABLE 24

| Input Parameter(s) Name | Data Type |
| --- | --- |
| IS_INVOICE_EXCEPTION_UI | BBPS_IMS_INVOICE_EXCEPTION_UI |

| Output Parameter(s) Name | Data Type |
| --- | --- |
| ES_RETURN | BAPIRETURN |

| Related table(s) |
| --- |
| BBPD_IMS_EXPPOOL, BBPD_IMS_EXPREF |

The exception pool may include an Agent API that adds an exception reference. Redundant fields such as EXP_ID and INV_ID may be set according to the related exception, rather than the fields of the input I_EXPREF. This may be used as another measure to keep the consistent of IMS_INVEXP and IMS_EXPREF tables.

TABLE 25

| Input Parameter(s) Name | Data Type |
| --- | --- |
| IV_EXCEPTION_ID | IMS_GUID |
| IS_EXCEPTION_REFERENCE | BBPS_IMS_EXCEPTION_REFERENCE |

| Output Parameter(s) Name | Data Type |
| --- | --- |

TABLE 25-continued

| ES_RETURN | BAPIRETURN |
| --- | --- |

Related table(s)
BBPD_IMS_EXPREF

Embodiments of the present invention may include a search engine to support invoice information retrieval. Techniques that may be used to search for information are disclosed in U.S. patent application Ser. No. 10/789,426, entitled "Fast Aggregation of Compressed Data Using Full Table Scans," filed Feb. 27, 2004 by Stefan Biedenstein et al., the contents of which is hereby incorporated herein by reference in its entirety. Additional techniques that may be used to search for information are disclosed in U.S. patent application Ser. No. 10/789,812, entitled "Merging Partial Results into Single Result," filed Feb. 27, 2004 by Jens-Peter Dittrich et al., the contents of which is hereby incorporated herein by reference in its entirety.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, an invoice management system may include some or all of the innovative features described above. Additionally, while one embodiment of an invoice management system may be advantageously implemented as a stand-alone software system, features and advantages of the present invention may also be obtained by incorporating the methods and/or software systems defined by the following claims as part of one or more existing systems. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving invoice data corresponding to a plurality of invoices;
verifying the invoices based on the invoice data;
generating an exception for each invoice that is not verified, each exception comprising invoice data for a particular invoice that is not verified;
generating, by at least one computer, an exception inbox graphical user interface for managing exceptions, wherein the exception inbox comprises a plurality of rows displaying different exceptions corresponding to particular invoices and a plurality of columns displaying invoice data for each exception; and
displaying the exception inbox to at least one user, wherein access to the invoice data for a particular exception is provided by selecting the particular exception in the exception inbox.

2. The method of claim 1 further comprising specifying, by a user, a plurality of exception handling procedures, wherein different exceptions are processed differently by different exception handling procedures.

3. The method of claim 2 wherein a first exception handling procedure specifies one or more users involved in resolving a particular exception.

4. The method of claim 1 further comprising:
automatically gathering, in response to receiving said invoice data, context information for the plurality of invoices, the context information comprising additional information corresponding to each invoice,
wherein invoice data and context information are associated with each exception, and the user accesses the context information for said particular exception by selecting the particular exception in the exception inbox.

5. The method of claim 1 wherein verifying the invoices comprises verifying the invoice data for each invoice using a plurality of checks, wherein an exception is generated if any of the checks are not successful.

6. The method of claim 5 wherein the exception inbox comprises a column specifying the particular check that was not successful, and wherein each of the plurality of rows displays a particular check that was not successful for a corresponding exception in said column.

7. The method of claim 5 further comprising automatically initiating different exception handling procedures based on the particular check that was not successful, wherein different exception handling procedures are initiated if different checks are not successful.

8. The method of claim 7 wherein one or more of said exception handling procedures are role based.

9. The method of claim 8 wherein one or more of said exception handling procedures filters information based on a role of said user.

10. The method of claim 8 wherein different users are contacted to resolve different types of problems based on different roles of said users.

11. A system comprising:
at least one computer, the at least one computer executing invoice processing software, the invoice processing software operable to:
receive invoice data corresponding to a plurality of invoices;
verify the invoices based on the invoice data;
generate an exception for each invoice that is not verified, each exception comprising invoice data for a particular invoice that is not verified;
generate an exception inbox graphical user interface for managing exceptions, wherein the exception inbox comprises a plurality of rows displaying different exceptions corresponding to particular invoices and a plurality of columns displaying invoice data for each exception; and
display the exception inbox to at least one user, wherein access to the invoice data for a particular exception is provided by selecting the particular exception in the exception inbox.

12. The system of claim 11 wherein the invoice processing software is further operable to specify, by a user, a plurality of exception handling procedures, wherein different exceptions are processed differently by different exception handling procedures.

13. The system of claim 12 wherein a first exception handling procedure specifies one or more users involved in resolving a particular exception.

14. The system of claim 11 wherein the invoice processing software is further operable to:
- automatically gather, in response to receiving said invoice data, context information for the plurality of invoices, the context information comprising additional information corresponding to each invoice,
- wherein invoice data and context information are associated with each exception, and the user accesses the context information for said particular exception by selecting the particular exception in the exception inbox.

15. The system of claim 11 wherein verifying the invoices comprises verifying the invoice data for each invoice using a plurality of checks, wherein an exception is generated if any of the checks are not successful.

16. The system of claim 15 wherein the exception inbox comprises a column specifying the particular check that was not successful, and wherein each of the plurality of rows displays a particular check that was not successful for a corresponding exception in said column.

17. The system of claim 15 wherein the invoice processing software is further operable to automatically initiate different exception handling procedures based on the particular check that was not successful, wherein different exception handling procedures are initiated if different checks are not successful.

18. The system of claim 17 wherein one or more of said exception handling procedures are role based.

19. The system of claim 18 wherein one or more of said exception handling procedures filters information based on a role of said user.

20. The system of claim 18 wherein different users are contacted to resolve different types of problems based on different roles of said users.

* * * * *